(12) United States Patent
Cardno et al.

(10) Patent No.: US 10,073,907 B2
(45) Date of Patent: *Sep. 11, 2018

(54) SYSTEM AND METHOD OF ANALYZING AND GRAPHICALLY REPRESENTING TRANSACTION ITEMS

(71) Applicant: New BIS Safe Luxco S.àr.l., Luxembourg (LU)

(72) Inventors: Andrew John Cardno, San Diego, CA (US); Peter Stewart Ingham, Lower Hutt (NZ); Bart Andrew Lewin, Woodland Hills, CA (US); Ashok Kumar Singh, Henderson, NV (US)

(73) Assignee: New BIS Safe Luxco S.à r.l, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/446,879

(22) Filed: Mar. 1, 2017

(65) Prior Publication Data
US 2017/0242908 A1 Aug. 24, 2017

Related U.S. Application Data

(63) Continuation of application No. 14/257,697, filed on Apr. 21, 2014, now Pat. No. 9,619,814, which is a
(Continued)

(51) Int. Cl.
G06F 17/30 (2006.01)
G06Q 30/02 (2012.01)

(52) U.S. Cl.
CPC .. *G06F 17/30598* (2013.01); *G06F 17/30061* (2013.01); *G06F 17/30327* (2013.01);
(Continued)

(58) Field of Classification Search
CPC combination set(s) only.
See application file for complete search history.

(56) References Cited

U.S. PATENT DOCUMENTS 3,801,774 A 4/1974 Michaelis et al.
4,438,326 A 3/1984 Uchida
(Continued)

FOREIGN PATENT DOCUMENTS

WO WO 2009/154479 12/2009

OTHER PUBLICATIONS

Bostock, Michael, and Jeffrey Heer. "Protovis: A graphical toolkit for visualization." IEEE transactions on visualization and computer graphics 15, No. 6 (2009).*
(Continued)

*Primary Examiner* — Farhan Syed
(74) *Attorney, Agent, or Firm* — Merchant & Gould P.C.

(57) ABSTRACT

A computer implemented method of analyzing and graphically representing the correlation of a plurality of transaction items, the method comprising the steps of: retrieving data associated with groups of the transaction items, correlating a plurality of groups of transaction items in a dimensionally reduced manner, creating a tree hierarchy which classifies the groups of transaction items in a hierarchy according to a defined user understandable factor, wherein the tree hierarchy is linked to the groups of transaction items, and graphically representing the correlated groups of transaction items and tree hierarchy to enable interaction between the correlated groups of transaction items and the linked tree hierarchy.

19 Claims, 23 Drawing Sheets

Related U.S. Application Data continuation of application No. 13/132,801, filed as application No. PCT/NZ2009/000277 on Dec. 4, 2009, now Pat. No. 8,745,086.

(60) Provisional application No. 61/120,194, filed on Dec. 5, 2008.

(52) U.S. Cl.
CPC ... *G06F 17/30572* (2013.01); *G06Q 30/0201* (2013.01); *G06Q 30/0204* (2013.01)

(56) References Cited

U.S. PATENT DOCUMENTS

| | | | |
|---|---|---|---|
| 5,269,020 A | 12/1993 | Kakimoto | |
| 5,414,839 A | 5/1995 | Joshi | |
| 5,588,104 A | 12/1996 | Lanier et al. | |
| 5,664,182 A | 9/1997 | Nierenberg et al. | |
| 5,678,040 A | 10/1997 | Vasudevan et al. | |
| 5,687,385 A | 11/1997 | Janay | |
| 5,809,266 A | 9/1998 | Touma et al. | |
| 5,881,255 A | 3/1999 | Kondo et al. | |
| 5,890,153 A | 3/1999 | Fukuda et al. | |
| 5,941,973 A | 8/1999 | Kondo et al. | |
| 5,945,982 A | 8/1999 | Higashio et al. | |
| 6,035,275 A | 3/2000 | Brode et al. | |
| 6,144,962 A | 11/2000 | Weinberg et al. | |
| 6,226,634 B1 | 5/2001 | Ogihara et al. | |
| 6,233,582 B1 | 5/2001 | Traversat et al. | |
| 6,289,354 B1 | 9/2001 | Aggarwal et al. | |
| 6,380,937 B1 | 4/2002 | Dong et al. | |
| 6,401,167 B1 | 6/2002 | Barth et al. | |
| 6,496,208 B1* | 12/2002 | Bernhardt | G06F 3/0489 715/764 |
| 6,567,814 B1* | 5/2003 | Bankier | G06F 17/30539 |
| 6,892,173 B1 | 5/2005 | Gaither et al. | |
| 6,995,768 B2 | 2/2006 | Jou et al. | |
| 7,590,613 B2 | 9/2009 | Verschell et al. | |
| 7,668,726 B2* | 2/2010 | Cardno | G06Q 10/101 705/1.1 |
| 7,694,219 B2 | 4/2010 | Xu | |
| 7,877,348 B2 | 1/2011 | Verschell et al. | |
| 8,046,271 B2 | 10/2011 | Jimenez et al. | |
| 8,050,974 B2 | 11/2011 | Lopez et al. | |
| 8,059,560 B2 | 11/2011 | Ushiyama et al. | |
| 8,126,911 B2 | 2/2012 | Hu et al. | |
| 8,229,785 B2 | 7/2012 | Fung et al. | |
| 8,745,086 B2* | 6/2014 | Cardno | G06Q 30/0201 707/775 |
| 2001/0034694 A1 | 10/2001 | Elias | |
| 2002/0158880 A1* | 10/2002 | Williams | G06T 15/04 345/582 |
| 2003/0107571 A1* | 6/2003 | Mulgan | G06F 17/175 345/420 |
| 2004/0036716 A1 | 2/2004 | Jordahl | |
| 2004/0107221 A1 | 6/2004 | Trepess et al. | |
| 2004/0139067 A1 | 7/2004 | Houle | |
| 2004/0181554 A1* | 9/2004 | Heckerman | G06F 17/30713 |
| 2005/0038630 A1 | 2/2005 | Verschell et al. | |
| 2005/0038767 A1 | 2/2005 | Verschell et al. | |
| 2005/0081188 A1 | 4/2005 | Kumar et al. | |
| 2005/0086681 A1 | 4/2005 | Ebihara et al. | |
| 2005/0102189 A1 | 5/2005 | Lopez et al. | |
| 2005/0192825 A1* | 9/2005 | Cardno | G06Q 10/101 705/1.1 |
| 2006/0122917 A1* | 6/2006 | Lokuge | G06F 17/30861 705/27.1 |
| 2006/0184461 A1* | 8/2006 | Mori | G06K 9/6219 706/13 |
| 2006/0259341 A1 | 11/2006 | Fung et al. | |
| 2007/0067452 A1 | 3/2007 | Fung et al. | |
| 2007/0130029 A1 | 6/2007 | Von Helmolt et al. | |
| 2007/0288602 A1 | 12/2007 | Sundaresan | |
| 2008/0065659 A1 | 3/2008 | Watanabe et al. | |
| 2008/0120129 A1* | 5/2008 | Seubert | G06Q 10/06 705/35 |
| 2009/0150355 A1* | 6/2009 | Garfinkle | G06F 17/30333 |
| 2010/0077326 A1 | 3/2010 | Verschell et al. | |
| 2011/0179370 A1 | 7/2011 | Cardno et al. | |
| 2012/0053986 A1 | 3/2012 | Cardno et al. | |
| 2012/0239600 A1 | 9/2012 | Bollinger | |

OTHER PUBLICATIONS

International Search Report for International Application No. PCT/NZ2009/000277 dated Mar. 10, 2010.

Agrawl et al. "Mining Association Rules between Sets of Items in Large Databases." *Proceedings of the 1993 ACM SIGMOD Conference*. Washington DC, USA. 1993. pp. 1-10.

Few. "BizViz:The Power of Visual Business Intelligence." Mar. 2007. www.perceptualedge.com.

Nasirn. "Geographical Information System (GIS) Implementaion Success: Some Lessons from the British Food Retailers." *Idea Group Publishing*. 2002. pp. 146-148.

Wikipedia; "Heat map"; Date Accessed, Jun. 10, 2008; http://en.wikipedia.org/w/index.php?title=Heat_map&direction=prev&oldid=227363166.

Nasdaq; Nasdaq-100 Dynamic Heatmap;Date Accessed, Jun. 10, 2008; http://screening.nasdaq.com/heatmaps/heatmap_100.asp.

Weather.com; Date Accessed, Jan. 31, 2008; http://web.archive.org/web/20080131213729/http://www.weather.com/.

Information Aesthetics; Information Aesthetics; "travel time maps"; Date Accessed, Jan. 31, 2008 http://web.archive.org/web/20080118183919/http://infosthetics.com/archives/locative/.

Wikipedia; Wikipedia; "Voronoi Diagram"; Date Accessed, Jan. 31, 2008 http://en.wikipedia.org/w/index.php?title=Voronoi_diagram&oldid=186998992.

Wikipedia; Wikipedia; "Thematic map"; Date Accessed, Jan. 31, 2008 http ://en.wikipedia.org/w/index.php?title=Thematic_map&oldid=188119765.

Wikipedia; Wikipedia; "Agile Software Development"; Date Accessed, Jan. 30, 2008 http://en.wikipedia.org/w/index.php?title=Agile_software_development&direction=prev&oldid=188287733.

Wikipedia; Wikipedia: "Dimensional Modeling"; Date Accessed: Apr. 10, 2008 http://en.wikipedia.org/w/index.php?title=Dimensional_modeling&direction=prev&oldid=208379041.

Kimball, Ralph, A Dimensional Modeling Manifesto; Date Accessed: Apr. 10, 2008 http://web.archive.org/web/20080511165658/http://www.dbmsmag.corn/9708d15.html.

Google; Google Maps; "KML Gallery: Explore the Earth on Google"; Date Accessed, Jan. 30, 2008; http://web.archive.org/web/20080213052317/http://earth.google.com/gallery/.

Wikipedia; Wikipedia; "Mean down time"; Date Accessed, Jan. 30, 2008; http://en.wikipedia.org/w/index.php?title=Mean_down_time&oldid=186946518.

Wikipedia; Wikipedia; "Mean time between failures"; Date Accessed, Jan. 30, 2008; http://en.wikipedia.org/w/index.php?title=Mean_time_between_failures&oldid=187007574.

Paris Technologies, Inc.; Paris Technologies; "OLAP"; Date Accessed, Jan. 30, 2008; http://web.archive.org/web/20080215091900/http://www.olap.com/.

Wikipedia; Wikipedia; "Planogram"; Date Accessed, Jan. 30, 2008; http://en.wikipedia.org/w/index.php?title=Planogram&clirection=prev&oldid=191335905.

Wikipedia; Wikipedia; "Software as a Service"; Date Accessed, Jan. 30, 2008; http://en.wikipedia.org/w/index.php?title=Software_as_a_service&oldid=187899008.

Wikipedia; Wikipedia; "Self-organizing map"; Date Accessed, Jan. 30, 2008; http://en.wikipedia.org/w/index.php?title=Self-organizing_map&oldid=178977188.

Zeiger, Stefan, Servlet Essentials, Version 1.3.6—Nov. 4, 1999; Date Accessed, Jan. 30, 2008; http://web.archive.org/web/20080113015246/http://www.novocode.com/doc/servlet-essentials/.

(56) References Cited

OTHER PUBLICATIONS

Six Sigma; Subject Matter Expert—SME; Date Accessed: Jan. 30, 2008; http://web.archive.org/web/20080222172537/http://www.isixsigma.com/dictionary/Subject_Matter_Expert_-SME-396.htm.
Sam's Publishing; developer.com Gamelan™; "Introduction to EJB 's"; http://www.developer.com/java/ejb/article.php/1434371.
IBM; Web Sphere Product Pages; "WebSphere software"; Date Accessed: Jan. 30, 2008; http://www-306.ibm.com/software/websphere/?pgel=ibmhzn&cmre=masthead-_-products-_-sw-websphere.

* cited by examiner

Figure 1A

| | | | | | | | | | |
|---|---|---|---|---|---|---|---|---|---|
| Nasdaq prices valid as of Jun. 9, 2008 Market Closed ||||||||||
| QQQQ -0.53% | | | | | | | | | |
| VRTX 2.54% | STLD 2.53% | RIMM 2.06% | DELL 1.73% | CTSH 1.73% | ATVI 1.65% | EXPD 1.62% | HANS 1.57% | SRCL 1.33% | SYMC 1.24% |
| BRCM 1.21% | MCHP 1.15% | Steel Dynamics, Inc. (STLD) |||||| ADSK 0.64% | JOYG 0.55% | DISCA 0.55% |
| YHOO 0.53% | PAYX 0.51% | Last Sale 38.97 |||||| WFMI 0.35% | AMAT 0.21% | COST 0.20% |
| AMGN 0.14% | CELG 0.13% | Net (Percent) Change: 0.96 (2.53%) |||||| CDNS 0.00% | DTV 0.00% | MICC -0.02% |
| CA -0.04% | QCOM -0.06% | Today's High : 39.15 |||||| PETM -0.22% | VMED -0.25% | CTAS -0.28% |
| XLNX -0.37% | IACI -0.38% | Today's Low: 38.01 |||||| TEVA -0.64% | LINTA -0.65% | EBAY -0.65% |
| DISH -0.74% | GILD -0.84% | Volume: 3,430,700 |||||| CTXS -1.12% | ALTR -1.13% | XRAY -1.15% |
| INFY -1.18% | FISV -1.28% | Previous Close: 38.01 |||||| AMZN -1.49% | KLAC -1.52% | NVDA -1.54% |
| GOOG -1.61% | NIHD -1.64% | 52 Week Range: 16.81 - 39.56 |||||| ISRG -2.07% | AAPL -2.17% | BBBY -2.26% |
| LOGI -2.63% | APOL -2.69% | |||||| LAMR -4.16% | URUA -4.17% | AMLN -10.32% |
| -10.32 | | | | | | | | | 10.32 |
| | | Java Applet Window ||||| | | |
| © 2001-2004 | | | | | | update: 2:16:34 PM, NZST |||

SYSTEM AND METHOD OF ANALYZING AND GRAPHICALLY REPRESENTING TRANSACTION ITEMS

This application is a Continuation of U.S. application Ser. No. 14/257,697, filed 21 Apr. 2014, which is a Continuation of U.S. application Ser. No. 13/132,801, filed 17 Nov. 2011, which is a National Stage Application of PCT/NZ2009/000277, filed 4 Dec. 2009, which claims benefit of U.S. Provisional Ser. No. 61/120,194, filed 5 Dec. 2008 and which applications are incorporated herein by reference. To the extent appropriate, a claim of priority is made to each of the above disclosed applications.

FIELD OF THE INVENTION

The present invention relates to methods, apparatus and systems for data visualization and related applications.

BACKGROUND

A chart or graph is described in Wikipedia as a type of information graphic or graphic organizer that represents tabular numeric data and/or functions. Charts are often used to make it easier to understand large quantities of data and the relationship between different parts of the data. Charts can usually be read more quickly than the raw data that they come from. They are used in a wide variety of fields, and can be created by hand (often on graph paper) or by computer using a charting application.

Traditional charts use well established and often poorly implemented ways of representing data. Many tools exist to help the user construct very sophisticated representations of data but that sophistication typically results in less meaningful charts. Embodiments of the present invention aim to overcome this problem.

It is known to use charting wizards such as those that are available in Excel and various other systems such as those provided by, for example, IBM. In addition there are multiple Business Intelligence (BI) tools available to users to enable users to analyze data in an attempt to create meaningful feedback. However, as the amount of data increases, so does the complexity of the visual representations created by the analysis of the data. These complex representations can end up swamping parts of the visual representation that is most required and relevant to an end user.

In addition, known systems provide a standardized list of options to all users which the user then must wade through and try and determine which of the options available are most suitable for representing their particular data. This can result in the user mismatching the data being represented with the chosen visual representation so that the resultant representation does not clearly, accurately and succinctly identify any issues with, or convey information about, the data. This can result in the user missing particularly important features of the data due to those features not being represented in the most appropriate manner.

Also, although there are many sophisticated visualization algorithms that do exist and are being developed for specific functions, these algorithms are not provided to a user in a manner that guides the user to easily pick the data to be represented, pick the correct summaries of the data, pick the right dimensions to be represented, pick the right forms of visual representation, or choose unique visual designs to create a collection of visualizations that help someone run their business.

Further, the focus of existing known methods is on providing a single visual design, or type of visual or graphical representation, to represent data. That is, to produce, for example, a single bar graph to be displayed, or a single pie chart to be printed. This is very limiting to a user who may want to show various different aspects of the data in a single document.

Business measures are a well known means of identifying a manageable number of algorithms for which to run a business. However, these business measures merely represent a single dimension of the data, or even only a single number, and so are particularly limiting in respect of the data that they represent. Further, the business measures merely represent data and do not include any further functional capabilities.

R-tree indexing methodologies, as well as other indexing methodologies, are used in conjunction with databases to categorize data and place the data in a hierarchical format. It is known to use self organizing maps to visually represent data. However, self organizing maps can be very difficult and arduous to interpret. Further, ways of organizing, categorizing or structuring self organized maps are required. Also, it has not previously been known to use the indexing methodologies, in particular the R-tree indexing, as a display mechanism on its own.

Various other references to the prior art and its associated problems are made throughout the following description.

The present invention aims to overcome, or at least alleviate, some or all of the mentioned problems, or to at least provide the public with a useful choice.

SUMMARY OF THE INVENTION

The present invention provides a system and method that enables visualization of correlated transaction items and their related hierarchy.

According to one aspect, the present invention provides a computer implemented method of analyzing and graphically representing the correlation of a plurality of transaction items, the method comprising the steps of: retrieving data associated with groups of the transaction items, correlating a plurality of groups of transaction items in a dimensionally reduced manner, creating a tree hierarchy which classifies the groups of transaction items in a hierarchy according to a defined user understandable factor, wherein the tree hierarchy is linked to the groups of transaction items, and graphically representing the correlated groups of transaction items and tree hierarchy to enable interaction between the correlated groups of transaction items and the linked tree hierarchy.

According to a further aspect, the present invention provides a graphical visualization system for analyzing and graphically representing the correlation of a plurality of transaction items, the system including: a data retrieval module arranged to retrieve data from a data storage module in communication with the graphical visualization system, wherein the retrieved data is associated with groups of the transaction items, a dimension module arranged to correlate a plurality of groups of transaction items in a dimensionally reduced manner, a hierarchical tree module arranged to create a tree hierarchy, wherein the tree hierarchy is arranged to classify the groups in a hierarchy according to a defined user understandable factor and is linked to the groups of transaction item, and an interaction module arranged to graphically represent interactions between the correlated groups of transaction items and the linked tree hierarchy.

BRIEF DESCRIPTION OF THE DRAWINGS

Embodiments of the present invention will now be described, by way of example only, with reference to the accompanying drawings, in which:

FIG. 1A shows a NASDAQ Heat Map Example;

Figure 1A:
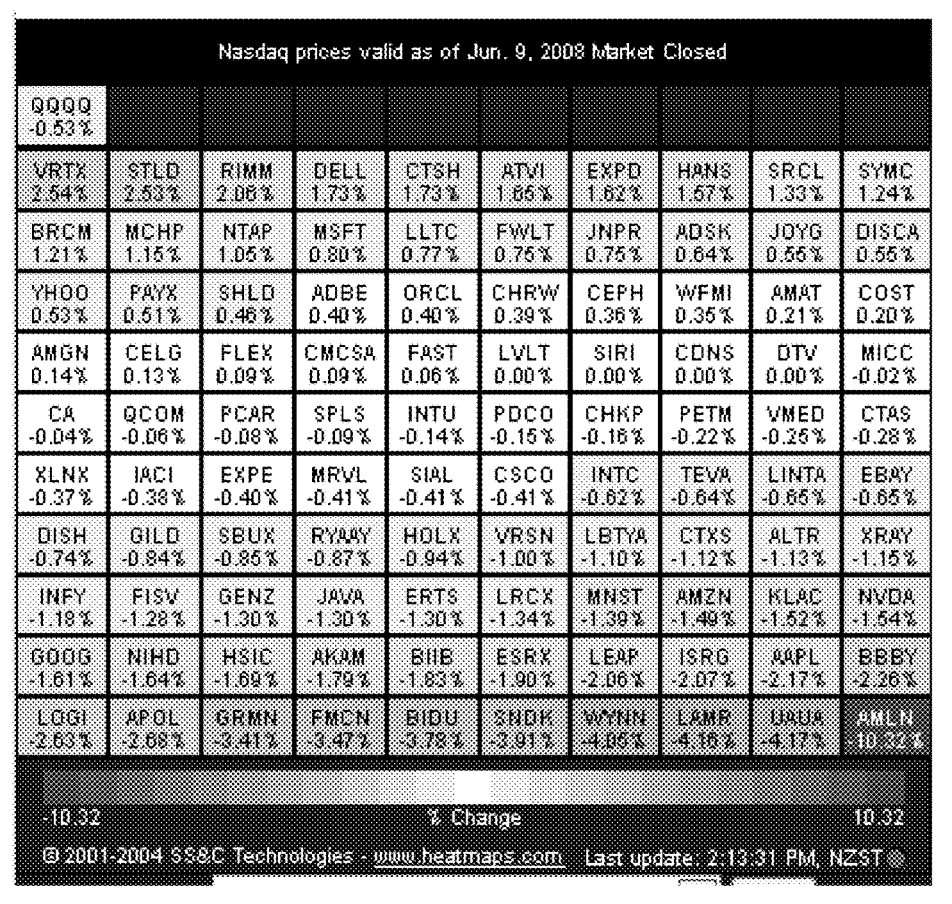

FIG. 1B shows a NASDAQ Heat Map Intra Day Data Example;

DETAILED DESCRIPTION OF THE INVENTION

Figure 1C:
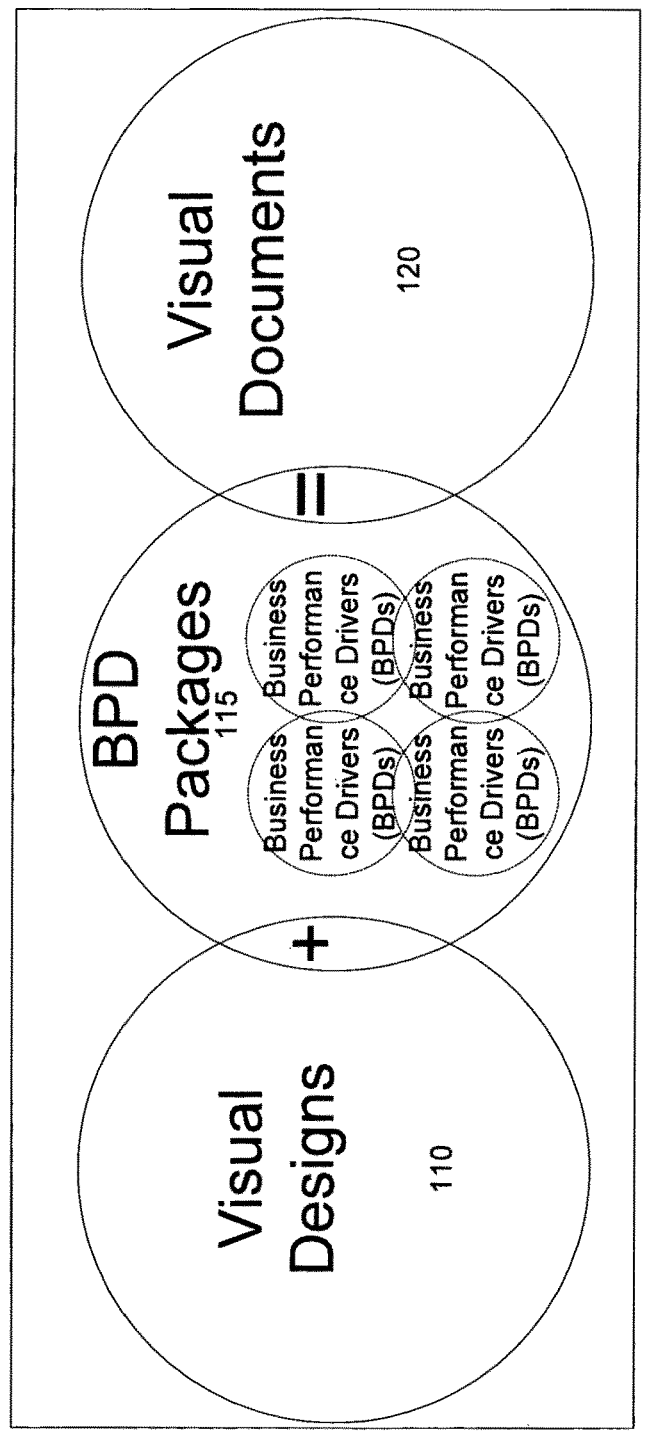
FIG. 1C shows a diagrammatical representation of some key terms.

Four key terms (or concepts) form the foundation of the specification set out in this document and accordingly have been defined as follows:

The four key terms are:
Business Performance Drivers (BPD)
BPD Packages
Visual Designs
Visual Documents The key terms are defined as follows:

Business Performance Drivers (BPDs): A Business Performance Driver (BPD) is a business metric used to quantify a business objective. For example, turnover, sales. BPDs are Facts (sometimes referred to as measures). Facts are data items that can be counted. For example, Gross Sales; Units Sold.

BPDs comprise of:
1. Measures: Data items that can be counted. For example, Gross Sales; Units Sold.
2. Dimensions: Data items that can be categorized. For example, Gender; Locations.
3. Restrictions can be applied to BPDs. These filter the data included. For example a restriction of 'State="CA"' may be specified to only include data for California.
4. Normalizations can be applied to BPDs. These specify (or alter) the time period the BPD refers to. For example—Daily Units Sold, Monthly Profit.

The combination of BPDs, Restrictions and Normalizations provides the flexibility to create many ways of looking at data without requiring extensive definition effort.

In other words a Business Performance Driver (BPD) is a 'measure' that can be normalized. Measures are data items that can be counted. For example, Gross Sales; Units Sold. BPDs might be displayed on visualizations. For example, Revenue earned per store on a map. Restrictions and/or Normalizations could be applied to a BPD. The following table provides examples of these:

| Scenario | Business Example |
| --- | --- |
| BPD (no normalization or restriction) | Revenue |
| BPD with restriction | Revenue earned in the state of California |
| BPD with normalization | Revenue earned in week 1 of 2008 |
| BPD with restriction and normalization | Revenue earned in the state of California in week 1 of 2008 |

BPD Packages: A BPD Package is made up from a set of related BPDs. This relationship (between a BPD Package and its BPDs) is defined using metadata.

BPD Packages can be thought of as the Visual Document's vocabulary.

Visual Designs: Visual Designs are a classification of the different types of visualizations that a user may choose. Within each Visual Design, there are a number of visualizations. For example, the 'spatial' category can have retail store location maps or geographical location maps.

The software solution allows users to select one visualization (one visual form within a Visual Design category) to create a Visual Document.

Visual Document: A Visual Document contains visual representations of data. Access to the data used to construct the visual representation is in many ways analogous to a textual document.

A Visual Document is constructed by applying BPD data to a specific Visual Design. It is designed to illustrate at least one specific point (using the visualization), supports the points made with empirical evidence, and may be extended to provide recommendations based on the points made. The Visual Document is a deliverable to the user.

| | |
| --- | --- |
| Dimensions | Dimensions are data items that can be categorized. For example, Gender; Locations. Dimensions might be displayed on visualizations. For example product categories on a shop floor. |
| Fact | See Business Performance Drivers (BPDs) |
| Measure | See Business Performance Drivers (BPDs) |

| | | |
|---|---|---|
| Normalizations | Can be applied to BPDs. These specify (or alter) the time period the BPD refers to. For example - Daily Units Sold, Monthly Profit. The combination of BPDs, Restrictions and Normalizations provides the flexibility to create many ways of looking at data without requiring extensive definition effort. Refer to definition of BPDs for examples. | |
| Restrictions | Can be applied to BPDs or Dimensions. These filter the data included. For example a restriction of 'State = "CA"' may be specified to only include data for California. A BPD or Dimension could be restricted by Compound Statements (series of restrictions using AND/OR statements). For example, Revenue from all stores where state = California AND units sold > 200 units. Restrictions have the following types: | |

| Restriction Type | Definition | Example | Business Context |
|---|---|---|---|
| = | Equal to | State = 'CA' | Revenue earned within the state of California |
| >= | Greater than or equal to | Units Sold >= 200 | Revenue earned from stores where units sold were greater than (or equal to) 200 units |
| =< | Less than or equal to | Revenue =< $50,000 | Revenue earned from stores where Revenue was less than (or equal to) $50,000 |
| > | Greater than | Units Sold > 200 | Revenue earned from stores where the number of units sold were greater than 200 units |
| < | Less than | Units Sold < 200 | Revenue earned from stores where the number of units sold were less than 200 units |
| IN | In (list) | State IN ('CA', 'NY') | Revenue earned from stores within the states of California and New York |
| BETWEEN | Values between X and Y | Product Code between '124' and '256' | Revenue earned from product codes 124 to 256 (inclusive) |
| NOT = | Not Equal to | State NOT = CA | Revenue earned from stores outside the state of California. |
| NOT IN | Not in (list) | State NOT IN ('CA', 'NY') | Revenue earned from outside the states of California and New York. |
| NOT BETWEEN | Values not between X and Y | Store Code NOT Between 105 and 110 | Revenue earned from stores excluding stores with a store code between 105 and 110 (inclusive). |

Heatmaps: A heat map is a graphical representation of data where the values taken by a variable in a two-dimensional map are represented as colors. A very similar presentation form is a Tree map.

Heat maps are typically used in Molecular Biology to represent the level of expression of many genes across a number of comparable samples (e.g. cells in different states, samples from different patients) as they are obtained from DNA microarrays.

Heat maps are also used in places where the data is volatile and representation of this data as a heat map improves usability. For example, NASDAQ uses heat maps to show the NASDAQ-100 index volatility. Source: Wikipedia[i]

This is shown diagrammatically in FIG. 1A. Some blocks are colored green, which means the stock price is up and some blocks are colored red, which means the stock price is down. The blocks have a varying deepening of the relevant color to indicate the direction that the stock is moving; the deeper the color, the bigger the move.

If a user hovers over a stock, additional intra-day data is presented—as shown in FIG. 1B: Source: Nasdaq.com[ii]

The key terms are set out diagrammatically in FIG. 1C. Visual designs 110 are individual visualization techniques. One or more are applied to visualize BPD packages 115 to create visual documents 120.

Many organizations are facing massive and increasing amounts of data to interpret, the need to make more complex decisions faster, and accordingly are turning to data visualization as a tool for transforming their data into a competitive advantage. This is particularly true for high-performance companies, but it also extends to any organization whose intellectual property exists in massive, growing data sets.

One objective of the described solution is to put experts' data visualization techniques in the customer's hands by skillfully guiding the end user through choosing the right parameters, to display the right data, and to create its most useful visualizations to improve business performance.

The described solution is a generic tool and can apply to multiple business areas that require decisions based on and understanding massive amounts of data. The resulting browser-based output is defined as a 'Visual Document'.

Figure 2A:
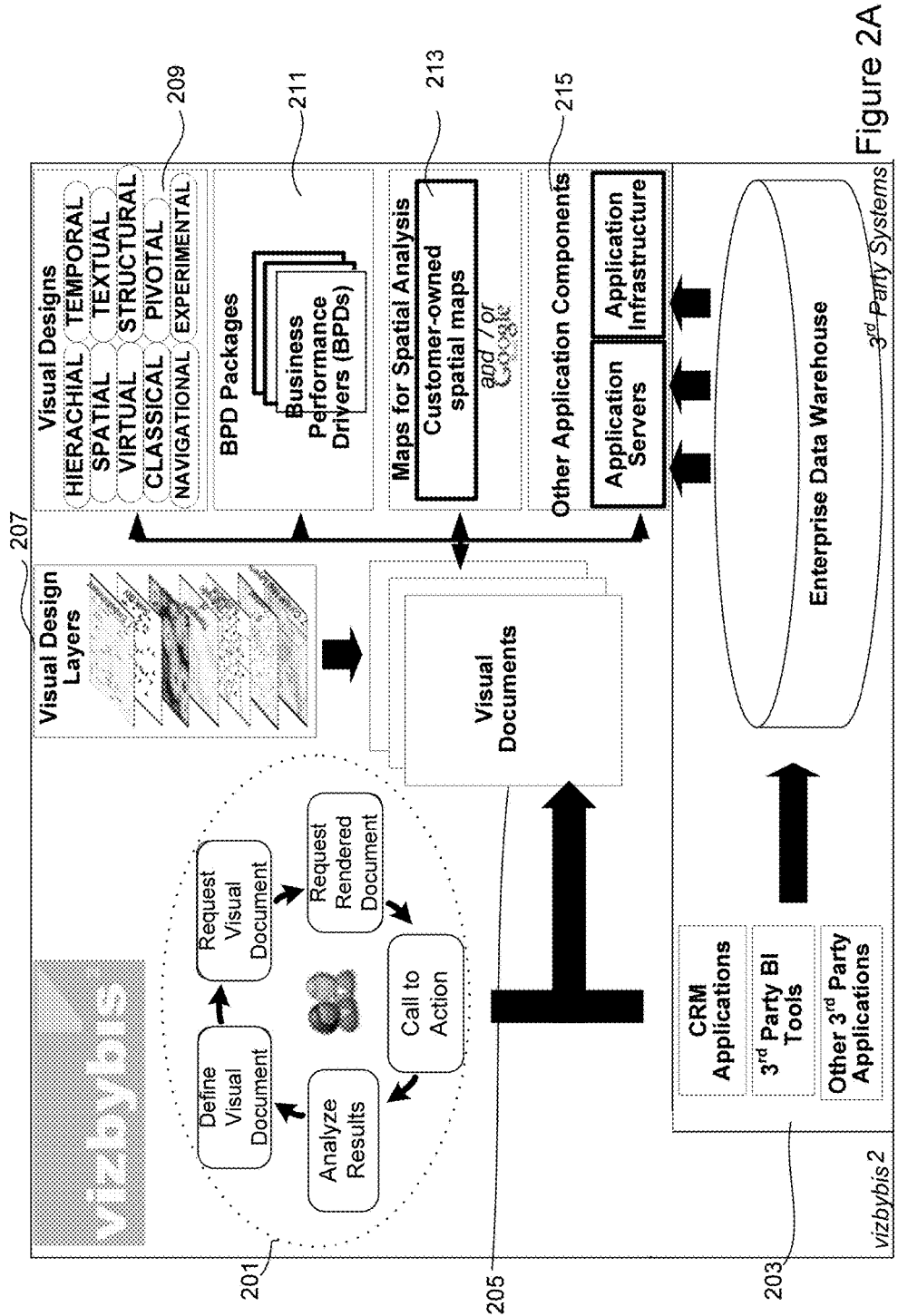
FIG. 2A shows a system concept diagram according to an embodiment of the present invention.

The solution provided is summarized in FIG. 2A.

The system identifies user tasks 201 in the form of defining visual documents, requesting visual documents, requesting rendered documents, calls to action, and analyzing results. These tasks are then detected by the system in conjunction with other systems 203, which include CRM applications, third party Business Intelligence (BI) Tools and other third party applications, all of which may access data stored in an enterprise data warehouse (EDW). The visual design layer concept 207 may be utilized within the visual documents 205. The creation of the visual documents is made in conjunction with a number of different defined visual design types 209, BPD packages 211, spatial analysis maps 213 and other application components 215, such as application servers and application infrastructure.

A Visual Document contains visual representations of data. Access to the data used to construct the visual representation is in many ways analogous to a textual document. It is constructed by applying Business Performance Driver(s) (BPD) data to a specific Visual Design (Visual Designs are grouped into ten classifications).

A Visual Document is designed to illustrate at least one specific point (using the visualization), support the points made with empirical evidence, and may be extended to provide recommendations based on the points made. The Visual Document is the actual deliverable from the software to the software user. Visual Documents may be stored, distributed or analyzed later, as needed.

The Visual Document is fed by data and a metadata database that stores definitions of BPDs—the BPDs are the focus of the Visual Document. A Business Performance Driver is a business metric used to quantify a business objective. Examples include, gross sales or units sold. For instance, the Visual Document may be used to graphically depict the relationship between several BPDs over time.

In the Visual Document, data is rendered in up to seven layers in one embodiment. However, it will be understood that the number of layers may be varied as needed by the user. Specific Visual Document Layers are described herein. However, it will be understood that further Visual Document Layers may be included over and above the specific types described.

Visual Designs are explicit techniques that facilitate analysis by quickly communicating sets of data (termed BPD Packages) related to BPDs. Once constructed, Visual Documents may be utilized to feed other systems within the enterprise (e.g., Customer Relationship Management (CRM) systems), or directly generate calls to action.

The described solution utilizes the best available technical underpinnings, tools, products and methods to actualize the availability of expert content.

At its foundation, the solution queries data from a high performance enterprise data warehouse characterized by parallel processing. This database can support both homogeneous (identical) and heterogeneous (differing but intersecting) databases. The system is adaptable for use with a plurality of third party database vendors.

A scalable advanced web server framework can be employed to provide the necessary services to run the application and deliver output over the web. A flexible and controllable graphics rendering engine can be used to maximize the quality and speed levels required to support both static and dynamic (which could be, for example, animated GIF, AVI or MPEG) displays. All components can operate with a robust operating system platform and within secure network architecture.

Pre-existing (and readily available) third party components can be employed to manage user security (e.g. operating system security), industry specific applications and OLAP (Online Analytical Processing) or other more traditional reporting. The described solution is designed to facilitate speedy and reliable interfaces to these products.

A predictive modeling interface assists the user in analyzing forecasted outcomes and in 'what if' analysis.

Strict security, testing, change and version control, and documentation standards can govern the development methodology.

Many organizations are facing massive and increasing amounts of data to interpret, the need to make more complex decisions faster, and accordingly are turning to data visualization as a tool for transforming their data into a competitive advantage. This is particularly true for high-performance companies, but it also extends to any organization whose intellectual property exists in massive, growing data sets.

This clash of (a) more data, (b) the increased complexity of decisions and (c) the need for faster decisions was recently recognized in an IDC White Paper (Gantz, John et. al.; IDC White Paper; "Taming Information Chaos: A State-of-the-Art Report on the Use of Business Intelligence for Decision Making" November 2007), which described this clash as the "Perfect Storm" and that this 'storm' will drive companies to make a quantum leap in their use of and sophistication in analytics.

Today's business tools and the way they operate barely allow business users to cope with historical internal data, let alone internal real time, predictive, and external data.

Hence, a new paradigm in business intelligence solutions is required.

System Overview

As explained above, FIG. 2A shows a high-level overview of the system.

There are five key components to the system. These are:
1. Visual Documents;
2. Visual Designs;
3. Business Performance Drivers (and BPD Packages);
4. Spatial Maps;
5. Application Components.

A description of each of these components is set out below under the respective headings.

Visual Documents

The Visual Documents form the core of the solution from a user perspective. This may include visualization(s), associated data and/or metadata (typically the visual form) that the user defines requests and interacts with. The Visual Documents may consist of single frames or animated frames (which could be, for example, implemented in AVI, GIF or MPEG format or a sequence of still images).

The Visual Document is typically viewed in a dynamic web browser view. In this interactive view the user may observe, select and navigate around the document.

Once created, the Visual Documents may be stored in the database and may be distributed to key persons (printed, emailed etc.) or stored for later use and analysis.

Visual Designs

The Visual Designs are a classification of the different types of visualizations that a user may choose. Within each Visual Design category, there are a number of visualizations. For example, the 'spatial' category can have retail store location maps, network maps or geographical location maps, such as, for example, maps available from Google™ or Yahoo™.

The described system allows users to select one or more visualizations (e.g. one visual form within a Visual Design category) to create a Visual Document.

There are ten Visual Design categories defined below, however it will be understood that further Visual Designs are envisaged, as well as the number of visualizations within each classification and the number of classifications.

Business Performance Drivers (and BPD Packages)

Business Performance Drivers (BPDs) are a metric applied to data to indicate a meaningful measurement within a business area, process or result. BPDs may be absolute or relative in their form of measurement.

The Business Performance Driver (BPD) concept differs from the known KPI concept by introducing BPDs that
(1) may have multiple dimensions,
(2) place the BPD in the context of the factors used to calculate them,
(3) provide well understood points of reference or metadata around which visual document creation decisions can be made, and
(4) may contain one or more methods of normalization of data.

Common groups of BPDs are called BPD Packages. For example, BPDs relating to one industry (say, telecommunications) can be grouped into one BPD Package. BPDs may be classified into one or more BPD Packages. For example, Net Revenue with normalizations available of per customer or per month may be applicable in a number of industries and hence, applicable to a number of BPD Packages.

Spatial Maps

Spatial maps allow for a user-owned and defined spatial map and/or for the user to use publicly available context maps such as Google™ Maps or Yahoo™ Maps. In either case, the user can display selected BPDs on the chosen spatial map.

Typically, a user-owned spatial map may be the inside floor space of a business and a publically available context map may be used for displaying BPDs on a geographic region e.g. a city, county, state, country or the world.

Application Components

The described application includes two main components, the Application Servers and the Application Infrastructure.

The Application Server includes a number of servers (or server processes) that include the Rendering Engine (to make (or render) the Visual Documents), Metadata Servers (for the BPD Packages, the Visual Designs and the BPDs) and the Request Queue.

The Application Infrastructure is also comprised of a number of servers (or server processes) that may include a Listener (which 'listens' for document requests) and central error logging.

Based on the user selections made above (Visual Documents, Visual Designs and BPDs), the user can click on an action and send a communication to a third party system (CRM, Business Intelligence or other application). The third party system could, for example, load the list from the solution and then send out a personalized email to all members on that list.

According to one embodiment, the described server components of the application are a Java based application and utilize application framework such as the IBM™ WebSphere application server framework, other platforms and server applications may be utilized as alternatives. The client application may be a mashup that utilizes the server components or it could be a rich internet application written using the Adobe™ Flash framework.

Other key elements of the system may include:
Parallelism—Parallel processing to increase responsiveness or to increase workload scalability of queries or Visual Documents. This parallelism may also decrease response time for larger visual documents in particular animated images may be executed in a parallel fashion.
Security—System and user-access security. This security may be a combination of authorization and authentication. The security framework may be implemented using the application framework.
Map Updates—A map management tool to update user-owned spatial maps.
Predictive Modeling—This may be an interface to third-party predictive models.
Configuration Tools—The application may be supported by configuration tools to enable rapid deployment of the application.

Modular Overview

Module Descriptions

Figure 2B:
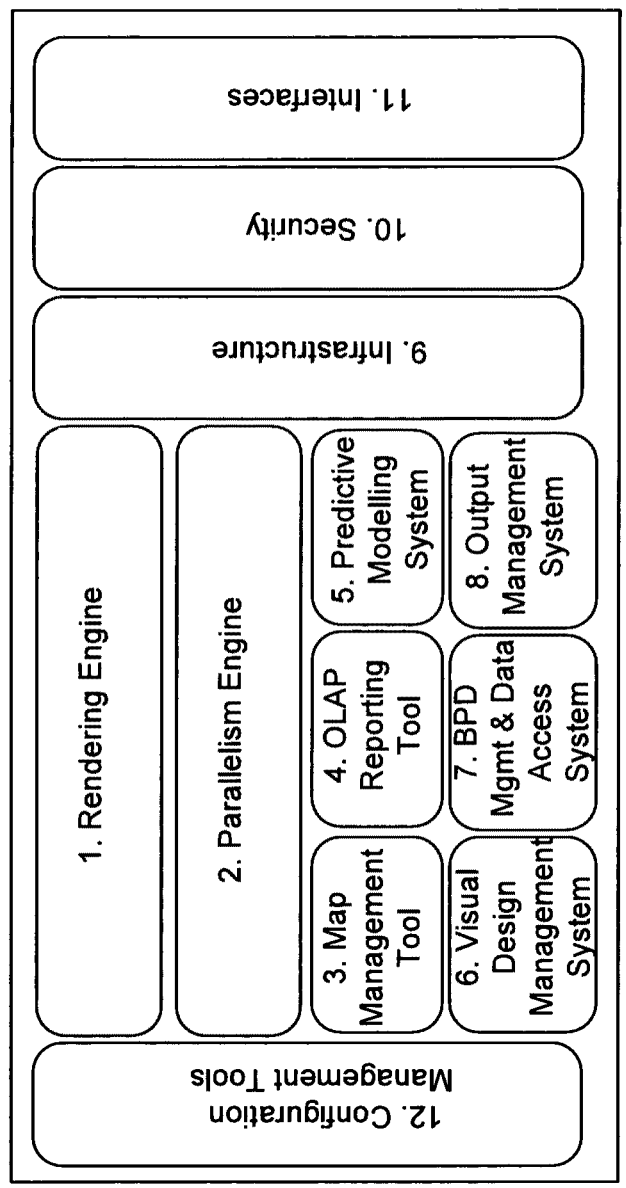
FIG. 2B shows an overview of the software modules in the described system.

The diagram shown in FIG. 2B shows an overview of the software modules in the described system.

These modules are described in the subsequent table. More detailed descriptions and diagrams of each of the software modules are provided below.

The table below outlines the following four items in relation to each module:
1. Technology System Component: This is the name given to the system component; this name matches the name in the above diagram.
2. High Level Functional Description: Describes the role of the software module.
3. Caching: Indicates whether this module uses caching to optimize performance.

| Technology System Component | High Level Functional Description | Caching |
|---|---|---|
| 1. Rendering Engine | Produces images and animations; could use Google ™ Maps or Yahoo ™ Maps for spatial context map. The development of Special Layers enables Visual Document produced to have unique capabilities that were not previously readily available. | Yes |
| 2. Parallelism Engine | Enables parallel execution of requests for high volume of Visual Document output and rapid results delivery to users. The preferred application framework selected is the IBM ™ WebSphere product. This framework enables the application to be scaled across multiple servers. | Yes |
| 3. Map Management Tool | Provides key map editing features (specifically CAD like) and map version control (desktop and enterprise) tools. | Yes |
| 4. OLAP Reporting | Industry standard online analytical reporting. For example, sorting, filtering, charting and multi-dimensional analysis. It is desirable that the user interaction with the data selection process in the data view is seamless with the data visualization view. For example, if the user selects 5 customers from the data view, the same 5 customers should be selected in the visualization view. This means that the solution may be a hybrid view (as discussed later). This hybrid view is a 'simple' view and is an interface to an industry leading OLAP tool. One option includes interfacing to the OLAP tool via a JDBC interface from the described solution or a web service model for the selection management. | Yes |
| 5. Predictive Modeling System | An interface to external predictive modeling engines; may also have some modeling systems. For example, Self Organizing Maps (SOM). | Yes |
| 6. Visual Design Management System | Tools for users to manage the different Visual Designs. | No |
| 7. BPD Management and Data Access System | Tools for users to manage the different BPD Packages and their associated BPDs. Contains Data Access capability that enables data to be queried from RDBMS (or potentially other data sources). | No |
| 8. Output Management System | For management of the documents (Visual Documents) within the system. | Yes |

-continued

| Technology System Component | High Level Functional Description | Caching |
|---|---|---|
| 9. Infrastructure | Core system management functions including system logging and Request Queue management. The Request Queue is also described under parallelism and there may be crossover between these two module descriptions. | Yes |
| 10. Security | Enables access to the system (or parts thereof) to be properly controlled and administered. | No |
| 11. Interfaces | Allows services to be called by (or to call) external applications. | No |
| 12. Implementation Tools | Tools to deploy and configure the software system. | Yes |

Architectural Views of the System

This section contains descriptions and diagrams of the architectural views of the system. The architecture shows how the system components fit and operate together to create an operational system. If compared to a vehicle, the wiring diagrams, the physical body, the driving circle and key complex components like the engine would be shown in architectural views.

This view does not describe how the system is written; it describes the high-level architectural considerations.

Architectural considerations are typically implemented by one or more software modules. The modular view described herein lays out a high-level view of how the software modules are arranged.

Figure 3:
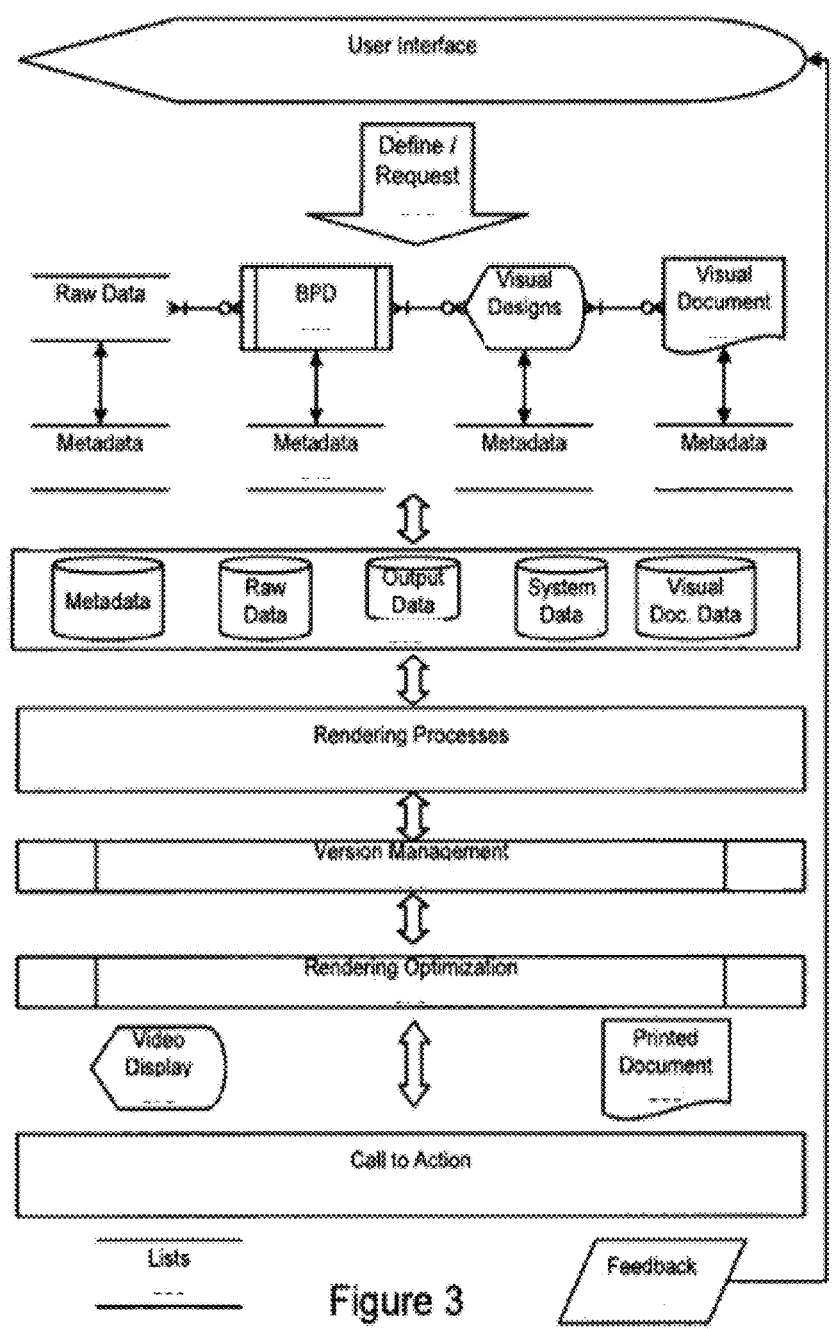
FIG. 3 shows a general overview of the data flow within the system according to an embodiment of the present invention.

FIG. 3 shows a general overview of the data flow within the system.

Figure 4:
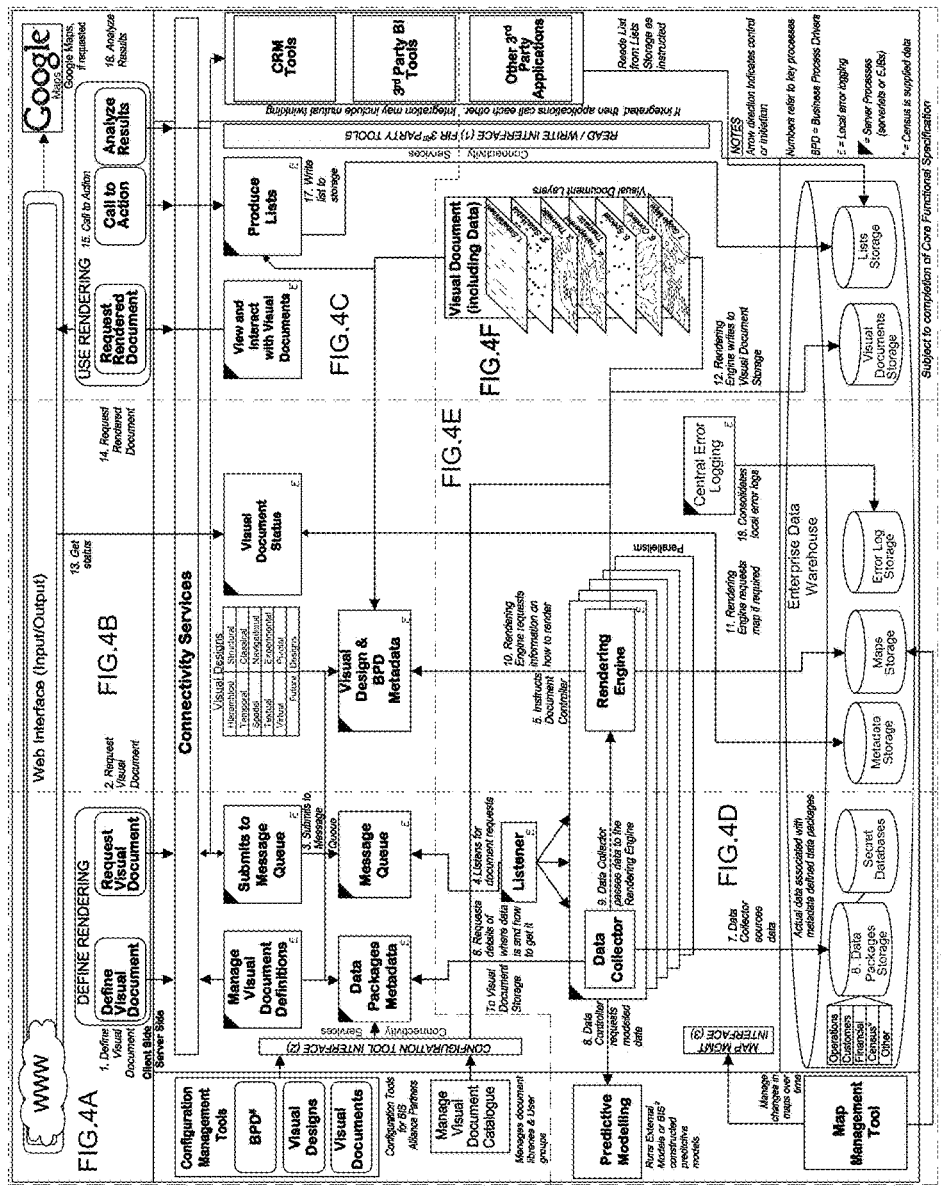
FIG. 4 (including FIGS. 4A-4F) show an architectural overview of the described solution according to an embodiment of the present invention.
Figure 4A:
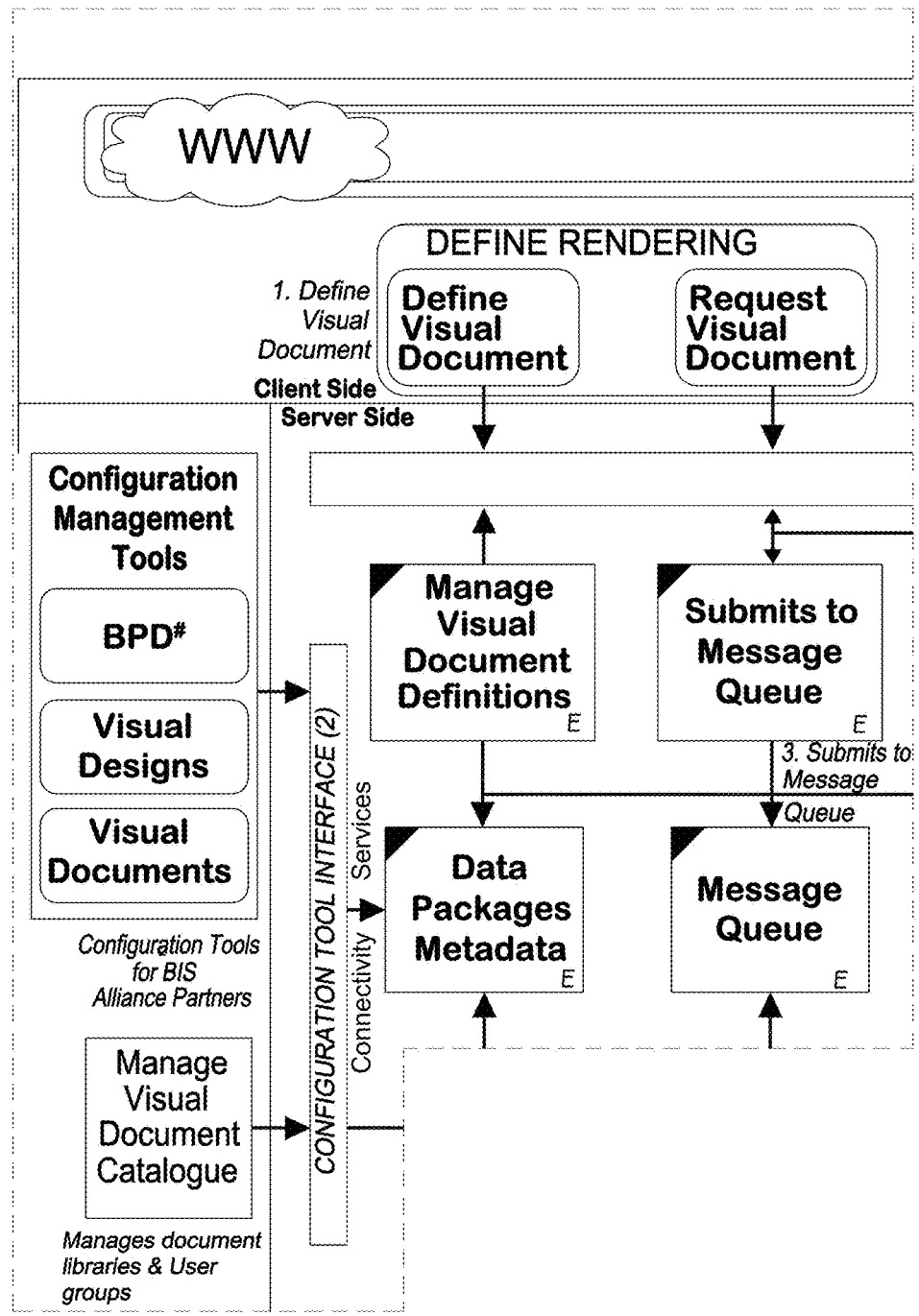
Figure 4B:
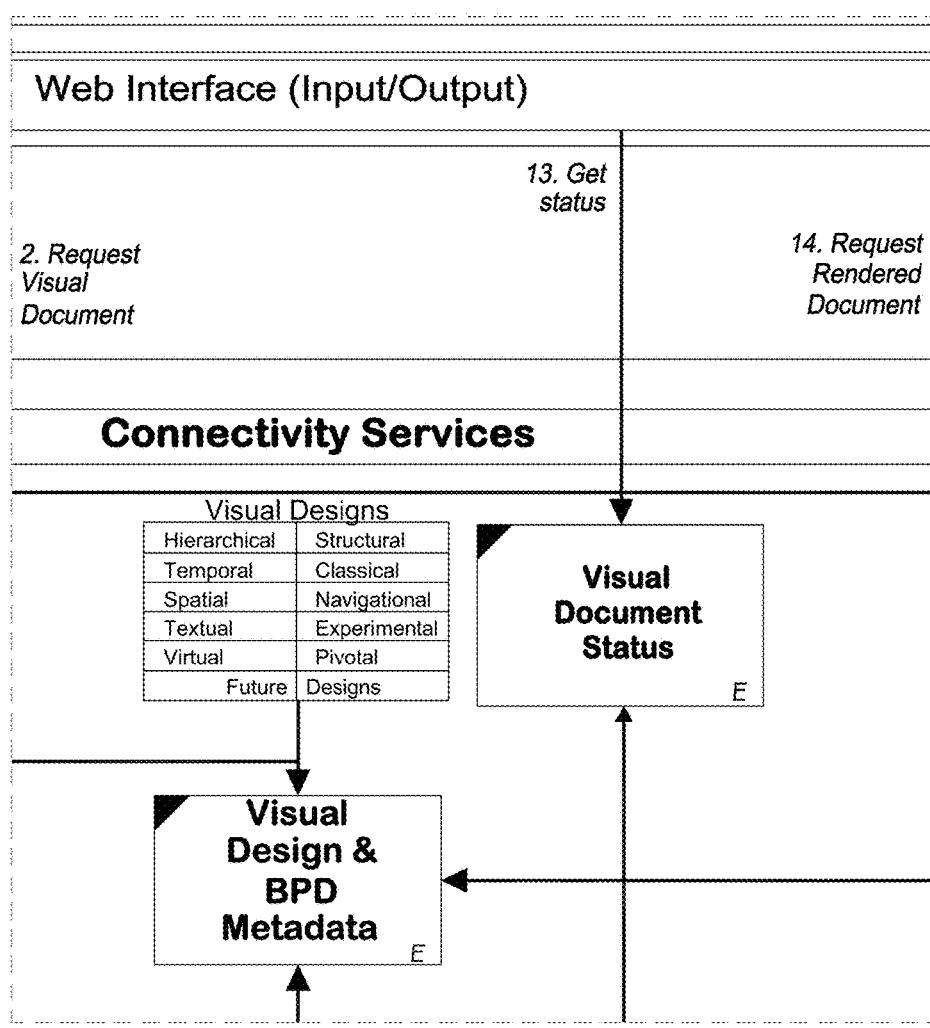
Figure 4C:
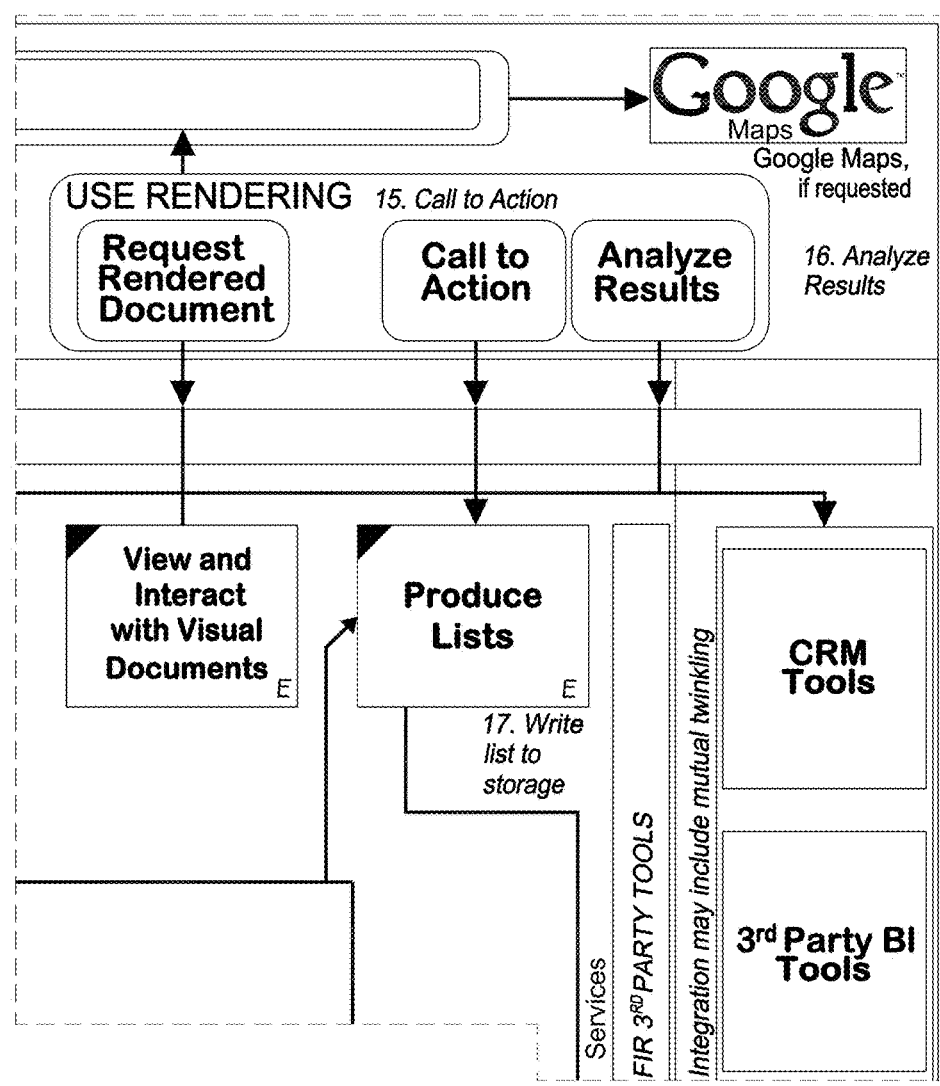
Figure 4D:
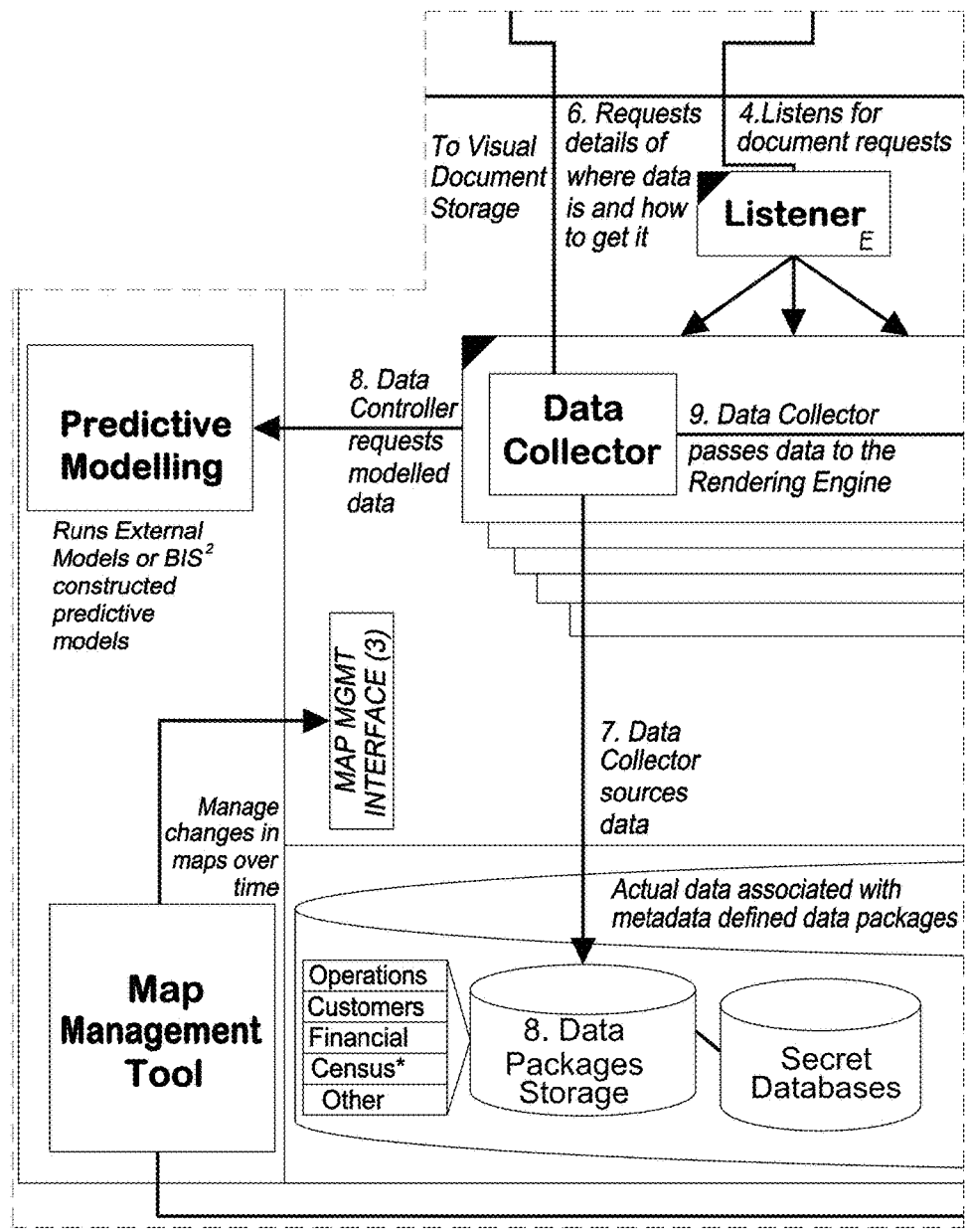
Figure 4E:
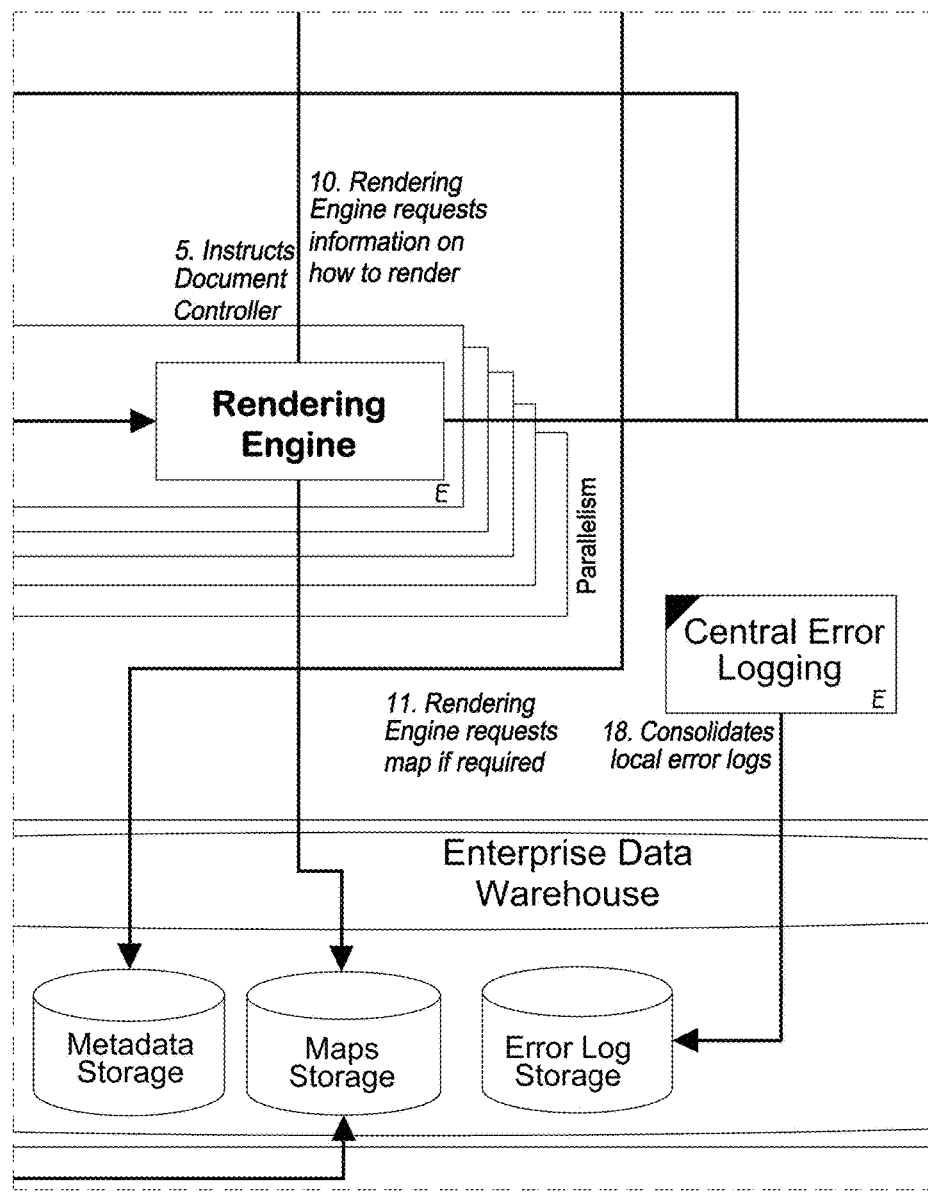
Figure 4F:
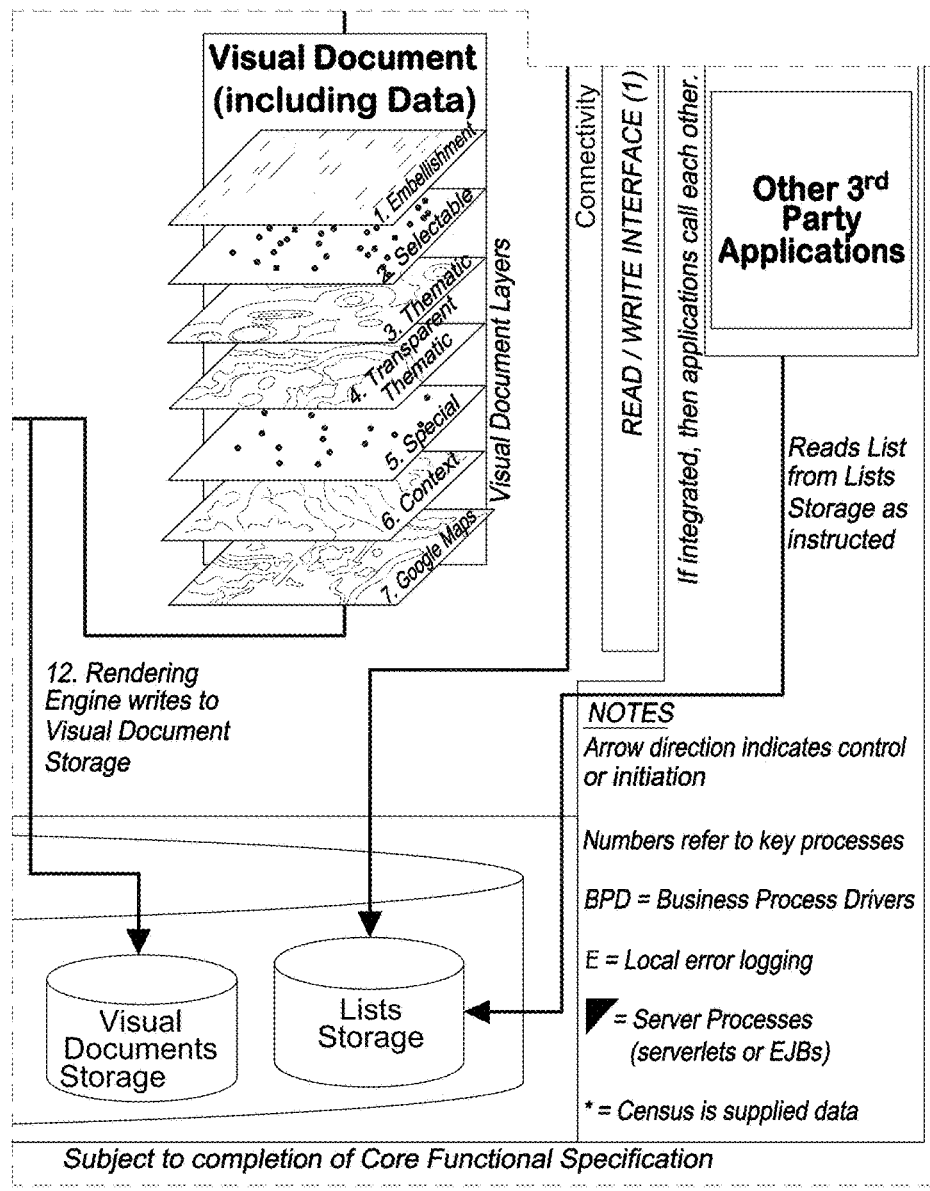

FIG. 4 shows the architectural overview of the described solution. This diagram is elaborated by the diagrams and descriptions in following sections of this document.

The following modules or components are shown:

Web interface Module 4105: User interfaces are browser based or may be a web services client, a rich internet application or may be a thick client. In all cases the user interface uses the same interface to the back end services.

Rendering Definition Module 4110: The user interface is used to define and request the rendering of Visual Documents Rendering Use Module 4115: Visual Documents are used for analysis, and precipitate calls to action.

Connectivity Services Module 4120: The definition and rendering of Visual Documents is performed through a set of programs or services called the Connectivity Services.

Configuration Management Tools Module 4125: Multiple versions of the basic elements; BPD, Visual Design, Visual Documents; are managed by a set of programs called the Configuration Management Tools.

Visual Document Management Catalog 4130: One such Configuration Management Tool (4125) is a set of programs that manage a users' catalog of available Visual Documents.

Predictive Modeling Module 4135: Predictive modeling is used for forecasting unknown data elements. These forecasts are used to predict future events and provide estimates for missing data.

Map Management Tool 4140: Another of the Configuration Management Tools (21125) is the Map Management Tool. It is designed to manage versions of the spatial elements of a visual design such as a geographic map or floor plan.

Visual Document Definitions Management Module 4145: Visual Document Definitions are managed through the use of metadata (4175).

Message Queue Submission Module 4150: Requests for Visual Documents are handled through queued messages sent between and within processes.

Visual Design Type Module 4155: Visual Documents are comprised of one or many Visual Designs in these categories.

Visual Document Status Module 4160: The status of Visual Documents is discerned from the metadata and displayed on the user interface.

Interaction and Visual Document View Module 4165: The user interacts with the Visual Documents through the user interface, and appropriate changes to and requests to read are made to the metadata.

List Production Module 4170: Where additional output such as customer lists are required, they are requested using the user interface and stored in the EDW (4215).

Data Packages Metadata Module 4175: Metadata is used to describe and process raw data (data packages).

Message Queue Module 4180: Messages may be queued while awaiting processing (4150).

Visual Design and BPD Metadata Module 4185: Metadata is used to describe and process the BPD's and Visual Designs associated with a particular Visual Document.

Visual Documents Module 4190: Visual Documents may be comprised of layered Visual Designs.

Third Party Modules 4195: Visual Documents may be used with or interact with other third party tools.

Listener Module 4200: The listener processes messages (4150) in the message queue (4180)

Document Controller Module 4205: The document controller is used to provide processed data to the rendering or query engines.

Central Error Logging Module 4210: System errors are detected and logged in the EWP (4215).

EDW 4215: All data is typically stored on a database, typically, multiple fault tolerant processors in an Enterprise Data Warehouse.

The following architectural components are described in more detail.

| Architectural Component | Description |
|---|---|
| Connectivity Services | This is a common communication service that is used when sending messages between systems (i.e. the described solution and $3^{rd}$ party tools) and between the described application layer and the user interface layer. |
| Configuration Management Tools | Allows specialized users to configure Visual Designs and Visual Documents to their needs - which differ from the default configuration provided. |
| Manage Visual Document Catalog | Gives selected users the ability to search, sort, group, and delete Visual Documents in the Visual Document Catalog. |
| Predictive Modeling | External modeling systems that use data sent from the described solution to perform complex calculations to produce predictive data. This predicted data is piped through the described solution to the user. |
| Map Management Tool | This is an application that enables users to create modify and delete individual maps to manage the complete sequences, this is very appropriate for management of floor plans. |
| Data Packages Metadata | The services responsible for providing metadata that enables the requester (typically, Data Collector) to source the data for the BPD. |
| Visual Design & BPD Metadata | The services responsible for providing the metadata to the requester (typically the Rendering Engine) that enables the construction of the Visual Documents. |

-continued

| Architectural Component | Description |
| --- | --- |
| Request Queue | The Request Queue manages the communication of requests for rendering of Visual Documents. These communications may be scheduled. |
| Document Controller | The Document Controller consists of two components. The first is the Data Collector responsible for reading the appropriate metadata and retrieving the data from the EDW (Enterprise Data Warehouse). This data is passed to the Rendering Engine that is responsible for producing the Visual Document. Document Controllers run parallel Visual Document requests, build and store documents. |
| Read/Write Interface for 3$^{rd}$ Party Tools | The described solution provides a common interface for 3$^{rd}$ party tools to communicate with e.g. CRM applications. |
| 3$^{rd}$ Party BI Tools | One of the 3$^{rd}$ party tools that the described solution may integrate with is an external OLAP tool. |
| Secret Databases | Secret databases are a method of sharing encrypted databases and providing a SQL interface that enables end users to run queries against atomic data without discovering the details of the data. |

The following terms have been also been used in FIG. 4. These are explained in more detail below.

| Architectural Component | Description |
| --- | --- |
| Logging | Logging (for example, error logging and access logging) is an inherently difficult activity in a parallel independent and predominantly stateless system.<br>The main issue that arises is that logging presents potential links between systems and therefore dependencies.<br>Typically within the application, each server will be responsible for its own logging. This ensures that the system scales without degradation in performance.<br>A separate process (central log reader) may be used to consolidate these logs dynamically as and when required. |
| Web Server | Web Servers respond to requests from users to provide Visual Documents. They read any required information from the metadata servers and Visual Document storage servers. If necessary they write Visual Document requests to the Request Queue. |
| Metadata Servers/Storage | Metadata servers are responsible for storage and user views of metadata. The metadata servers are also responsible for the validation of user rights to read Visual Documents (within the application). |
| Visual Document Storage | The Visual Document Catalog is a secure storage for all Visual Documents. Access is only possible when security requirements are met. |
| Data Collector | Typically the data collector queries the customer's data warehouse. The data warehouse can be augmented with additional subscribed embellishment data. This will provide the raw data that is represented visually back to the user. |
| BPD Packages Metadata | The described solution will use metadata to define groups of BPDs. These groups of BPDs are called BPD Packages. BPD Packages enable both internal data measures to be efficiently installed and external datasets to be provided.<br>BPD packages contain no data. |

Figure 5:
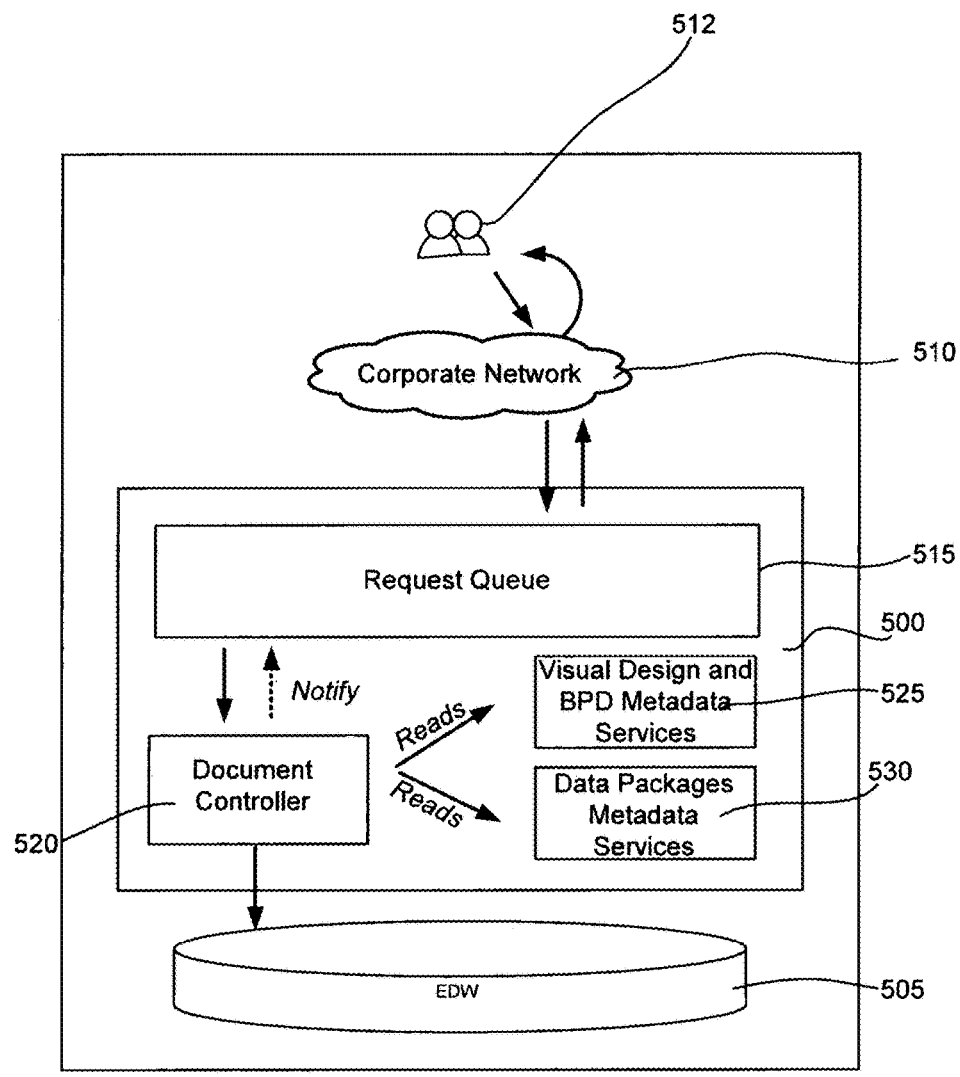
FIG. 5 shows a high-level system delivery overview of the described solution according to an embodiment of the present invention.

A further high-level system delivery overview of the solution is set out as shown in FIG. 5.

The described solution 500 is hosted by the enterprise 510. The figure shows the logical flow from the submission of a request to the end result, viewing the rendered Visual Document.

The data being visualized belongs to the customer 512 and the submitted request is unknown to the entity running the visualization system 500.

The controlling entity, integrators and customers may wish to have summaries of technical performance data (usage patterns, errors etc) sent from the operational system back to the integrator or controlling entity.

The system 500 has access to the data in a EDW 505. The system utilizes a request queue 515 to control requests from a corporate network 510. These requests are forwarded to a document controller 520. The document controller 520 accesses both the EDW 505 and reads visual designs and BPD metadata services 525, as well as data packages metadata services 530.

The system described thus enables various methods to be performed. For example, data is transformed into visually interpretable information. The visually interpretable information is in the form of visual representations that are placed within one or more visual documents.

Figure 6A:
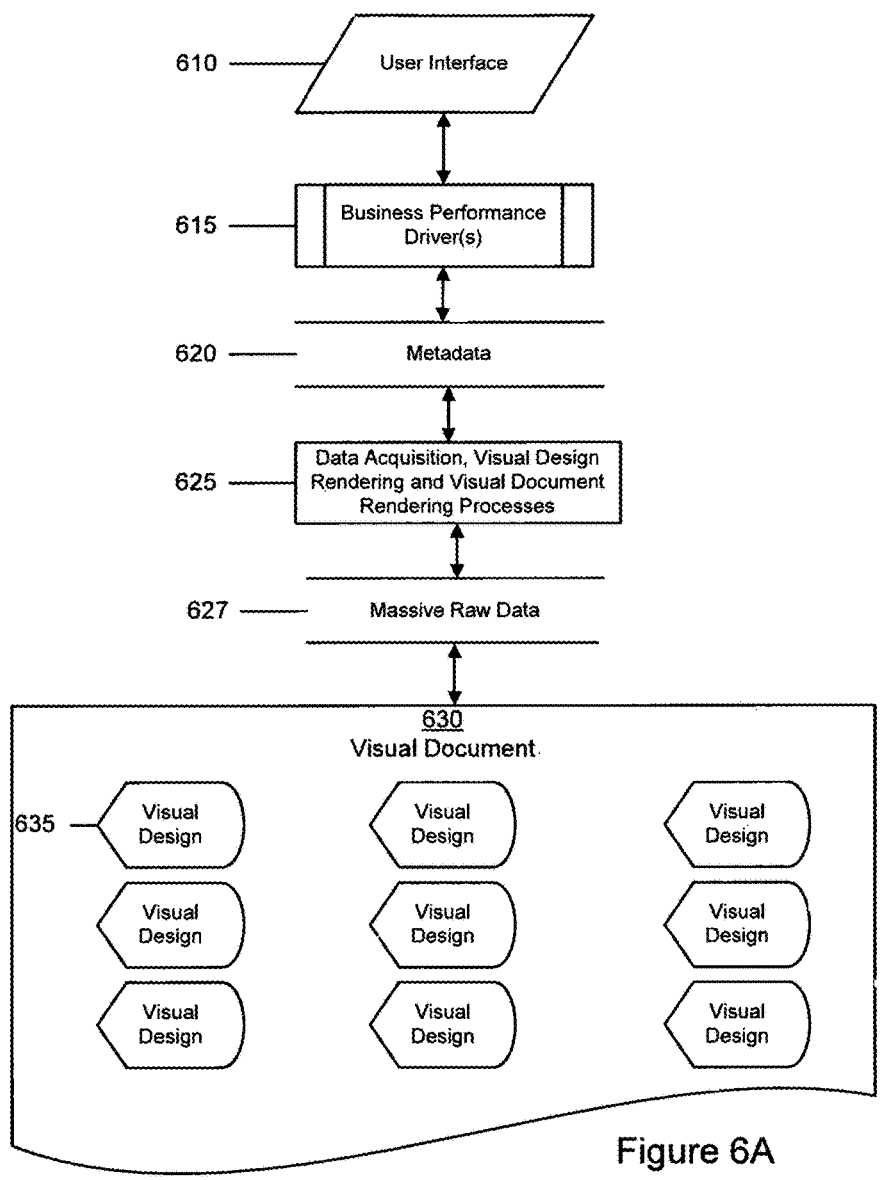
FIG. 6A shows a general data flow diagram according to an embodiment of the present invention.

FIG. 6A shows a general data flow diagram for the described system.

The User Interface 610 allows the user to define BPD's 615 in terms of raw data 627, which become the focus of the Visual Document 630.

Further, the User Interface 610 allows the user, through automated expert help, to create the Metadata 620, the most appropriate Visual Designs 635 that make up the Visual Document 625 in order to provide detailed analysis of data related to the BPD 615. The data acquisition, visual design rendering and visual document rendering processes utilize massive amounts of raw data 627.

The Metadata 620 is used by the Processes 625 to optimize the acquisition of the appropriate Data 627, processing of the data into useful information, and to optimize the creation and rendering of the Visual Designs 635 and the Visual Document 630 that contains them.

This method includes the steps of providing comprehensive yet easy to understand instructions to an end user that has accessed the system and the visual design application. The instructions assist the end user in obtaining data associated with a theme, wherein the theme may be focused on objectives that have been derived from the data. The objectives may be business objectives, for example. In this way, the system guides a user carefully through the many choices that are available to them in creating the visual representations, and the system automatically tailors its instructions according to not only what the user requires, but also according to the data that is to be represented. The system focuses on providing instructions to enable a visual representation to be created that will enable an end user to more effectively understand the data that has been collated.

Further, the instructions assist the end user in determining one or more summaries of the obtained data that enable the end user to understand the theme, as well as organizing the determined summaries into one or more contextual representations that contribute to the end user's understanding of the theme.

Further, instructions are provided that assist an end user in constructing one or more graphical representations of the data, where each graphical representation is of a predefined type, as discussed in more detail below, and includes multiple layers of elements that contribute to the end user's understanding of the theme.

Finally, instructions are provided to assist an end user in arranging the produced multiple graphical representations in a manner that enables the end user to understand and focus on the theme being represented as well as to display or print the organized graphical representations. The system assists in the organization or arrangement of the representations, elements thereof, within the visual document so as to ensure certain criteria are met, such as, for example, providing a suitable representation in the space available, using the minimum amount or volume of ink to create the representation, and providing a suitable representation that depicts the theme in a succinct manner, or visually simplistic manner.

The data being processed to create the graphical representations may be particularly relevant to the theme being displayed, disparate information or indeed a combination of relevant and disparate information.

There are multiple types of graphical representations that may be included within the visual document. The types are discussed in more detail below and include a hierarchical type, a spatial type, a virtual type, a classical type, a navigational type, a temporal type, a textual type, a structural type, a pivotal type, and an interactive type.

Further, the instructions may assist an end user in arranging the graphical representations in order to display high density data in a manner that conveys important information about the data, rather than swamping the end user with multiple representations that look impressive but do not convey much information.

In addition instructions may be provided to assist the end user in arranging the graphical representations to allow supplementary information to be added, where the supplementary information may be provided in any suitable form. Particular examples provided below depict the supplementary information being provided in subsequent visual layers that overlay the graphical representation. Alternatively, or in addition, supplementary information may include additional elements to be displayed within a single layer of the representation, for example, in the form of widgets.

Figure 6B:
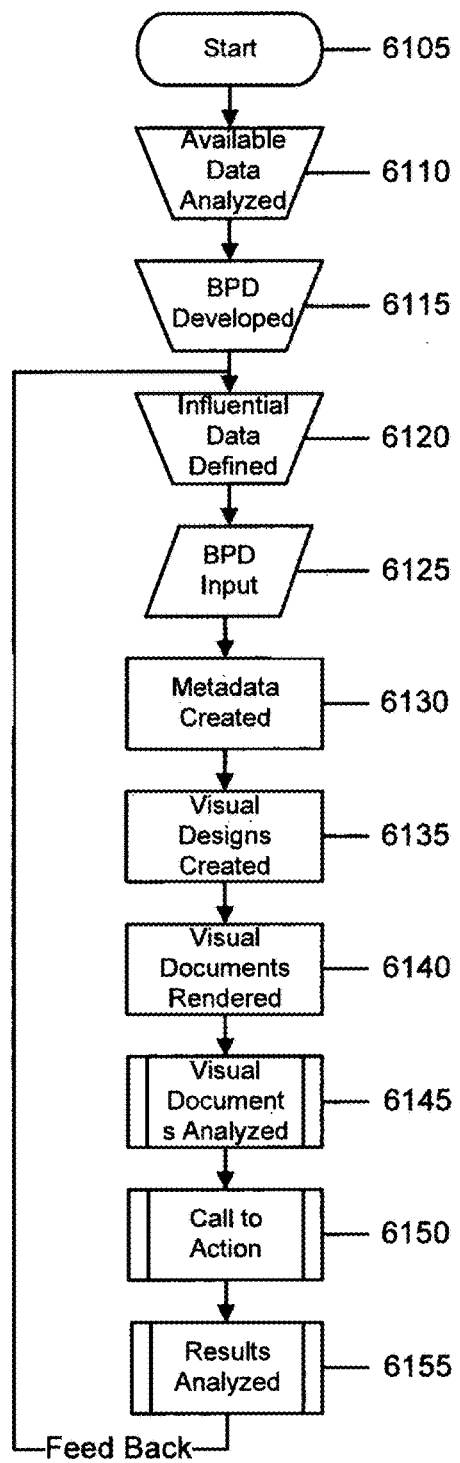
FIG. 6B shows a flow diagram according to an embodiment of the present invention.

FIG. 6B shows a flow diagram according to this embodiment of the invention.

Step 6105: Process Starts. User decides to manage the business.

Step 6110: Available data is identified and analyzed.

Step 6115: Business Process Drivers (metrics defined in terms of the data to indicate a meaningful measurement within a business area, process or result).

Step 6120: Data influencing the BPD metrics are identified.

Step 6125: BPD's are input into a computer system

Step 6130: BPD is categorized and appropriate metadata describing it is generated.

Step 6135: Visual Designs to display the influential data are created.

Step 6140: Visual Designs are aggregated into Visual Documents and rendered. Adjustments are made based on the freshness of all components (e.g., BPD, available data).

Step 6145: Visual documents are analyzed by the end user.

Step 6150: The end user decides on and implements actions based on the analysis in 6145.

Step 6155: The results are analyzed.

As touched on above, business performance drivers (BPDs) are used to enable more efficient data analysis so as to produce accurate and relevant visual representations of the data. A BPD is a form of advanced business measure wherein additional information is included within the BPD that enables the system using the BPD to understand how to manipulate the BPD. That is, one or more intelligent attributes are included with the business measure to form the BPD, where those attributes reference or include information on how the BPD is to be processed or displayed. The form of processing and display may also be varied according to the device type or media upon which the business measures are to be displayed.

The attributes are attached to the business measure by storing the BPD in the form of a mark up language, such as, for example, HTML or XML. It will however be understood that any other suitable format for storing the BPD may be used where the attributes can be linked to the business measure.

In the example of HTML, the attribute is included as a tag. One such example would be to include the data or business measure within the body of the HTML code and follow the business measure with a tag that references the attributes, or dimensions, associated with that business measure.

Further, the attributes may also be modified or deleted, or indeed new attributes added, during or after the processing of the BPD so that the attributes are maintained, or kept up to date, bearing in mind the requirements of the entity using the BPD to visualize their data.

The business performance drivers, or measurable business objectives, are identified in order to create graphical representations of the business objectives, where those representations are placed within a visual document. A business objective may be, for example, a metric associated with a business.

Instructions are provided by the system to the end user, in order to assist the end user in establishing multiple business objectives as functions of available metrics, as well as assisting the user in organizing the business objectives into a contextual form that contributes to the end user's understanding of the business objectives.

Further, instructions are provided to assist the end user in constructing one or more graphical representations of the business objectives, where each graphical representation is of a predefined type, as mentioned above and described in more detail below. Further, each graphical representation includes multiple layers of elements that contribute to the end user's understanding of the business objective.

The elements within the graphical representation may include, for example, a shape, position, color, size, or animation of a particular object.

Instructions are also provided by the system to assist the user in arranging multiple graphical representations in a suitable manner that enables the end user to understand and focus on the business objectives being represented.

Finally, the end user is also assisted with instructions on how to display the organized graphical representations.

The following section describes a method of creating a visual representation of data in the form of a visual design.

The method includes the steps of the system providing instructions to an end user to assist the end user in constructing multiple graphical representations of data, where each graphical representation is one of a predefined type, as defined above and explained in more detail below, and the graphical representation includes multiple layers of elements that contribute to the end user's understanding of the data The system also provides instructions to an end user that assist the end user with arranging multiple graphical representations of different types within the visual representation in a manner that enables the end user to understand and focus on the data being represented, as well as providing instructions to assist the end user in displaying the visual representation in a suitable manner.

The visual representation may be displayed in a number of different ways, such as on a color video screen or a printed page. The information that is forwarded to the display device to create the visual representation may differ according the type of display device so that the visual representation is produced in the best known suitable manner utilizing the advantages of the display device, and avoiding any disadvantages.

The data being displayed may be based on a measured metric or an underlying factor that affects a metric.

The elements within the graphical representation may include a shape, position, color, size or animation of a particular object.

Although a single visual document may include only one type of graphical representation, either in the form of multiple graphical representations or a single representation, there will also be situations where multiple types of graphical representations may be organized within a single visual document in order to convey different aspects of the data, such as, for example, temporal as well as spatial information. The inclusion of different types of graphical representations within a single document can provide an end user with a better understanding of the data being visualized.

Further, the single visual representation may be arranged to be displayed as an image on a single page or screen. This may be particularly useful where space is at a premium yet the user requires the visual representation to be provided in a succinct manner. For example, the user may request certain information to be displayed in a visual representation on a single mobile telephone display, or a single screen of a computer display, in order to show a customer or colleague the results of a particular analysis without the need to flick between multiple screens which can result in confusion, a waste of energy and ultimately a loss of understanding of the visual representations.

The same issue applies to printed representations, where the result of the system enabling a user to arrange a single representation, which may include multiple elements or layers, on a single page not only succinctly represents the data being analyzed but also saves the amount of paper being printed on and the amount of ink being used to print the document.

Further, the amount of ink required for a visual representation may be further reduced by providing instructions to the end user in a manner that directs them to control and use white space in a representation in an efficient manner so as to reduce the requirement of ink.

Multiple types of graphical representations may be merged together within a single visual document, or representation.

As mentioned above, instructions can be provided by the system to assist the end user in adding supplementary information to the visual representation, and the supplementary information may be provided in layers within the representation.

Visualization Framework

The following description provides the visualization framework that will support embodiments of the present invention. The description includes an overview of the importance of Visual Design including a brief historical recount of a world-recognized leading visualization. The description also sets out the Visual Design classifications for the described solution.

It will be understood that the Visual Design examples described in this section are examples for illustrative purposes to identify the concepts behind how the visualization is produced. Therefore, it will further be understood that the concepts described can produce visual designs different to those specifically described. The Visual Design examples shown are also used to help the reader understand the narrative describing the Visual Designs.

The system described is specifically adapted to create actual specific visualization designs relevant to selected vertical and horizontal industry applications being deployed.

A vertical industry application is one that is associated with a solution directed at a specific industry, such as, for example, the entertainment industry. In this example, BPDs relevant to that industry are created, such as rental patterns of movies over different seasons.

A horizontal industry application is one that is associated with solutions across multiple industries. For example, the BPD may be based on CRM analytics, which applies across a whole range of different industries.

Design is now a fundamental part of almost every aspect of how people live work and breath. Everything is designed from a toothbrush to every aspect of a web site. Compare visual design to architectural design—in both cases anybody can draw quite complex pictures. The resulting pictures could have stimulating and well drawn graphic elements. In both cases, the question is why does the world need designers? Exploring this question more deeply one can ask—does it make such a difference to how one perceives and understands a design when it is made by a professional rather than an amateur?

The trend in business intelligence is to design tools to provide flexibility and leave the world of visual design to the amateurs. Stephen Few comments in Information Dashboard Design[iii] that "Without a doubt I owe the greatest debt of gratitude to the many software vendors who have done so much to make this book necessary by failing to address or even contemplate the visual design needs of dashboards. Their kind disregard for visual design has given me focus, ignited my passion, and guaranteed my livelihood for years to come."

Visual Designs within the described framework are well thought through in how the data is displayed. The described system allows good information visualization design concepts to be captured and delivered back to users as Visual Documents using unique data processing and analysis techniques.

Visual Designs

Method or Visual Design Classifications

Ten Visual Design types are defined and incorporated into the described system. It will be understood that additional Visual Designs may be further defined including the creation of certain examples and actual Visual Designs for specific industry applications.

The visual design types include:
Hierarchical
Temporal
Spatial
Textual
Virtual
Structural
Classical
Pivotal
Navigational
Interactive 1. Hierarchical Visual Designs One purpose of a hierarchical visual design is to present large scale hierarchical data in one display. It is a picture for understanding, monitoring, exploring and analyzing hierarchical data.

Key elements of hierarchical visual designs are:
Data is hierarchical.
Structure of data can determine hierarchy.
They can be overlaid with connections.

This type of visualization may be automatically generated from a table of contents. This automatically generated hierarchy then becomes a special layer over which specific information can be overlaid.

The Hierarchical Visual Design is a hierarchical diagram such as an organizational chart or a correlation matrix.

This Visual Design has at least one natural centre and typically has a higher density toward the fringes of the visualization. The Hierarchical Visual Design can typically be considered as a 'tree' structure. The nodes and vertices within the tree structure are best if they are generated automatically from a dataset. This tree structure is a good example of a Special Layer.

The development process will include building a tree that is optimized for this type of Visual Design including heat mapping techniques.

Large scale hierarchical data is represented using various techniques such as mapping to icons, shapes, colors and heights.

Typical uses include mapping of web pages, organizational charts, decision trees and menu options.

2. Temporal Visual Designs

One purpose of a temporal visual design is to present temporal based data, such as, for example, revenue per day, in a specially designed calendar or time series view. This calendar view will enable users to view thematic layers that display BPD information such as revenue or sales.

This type of visual design is a completely data defined Visual Design. The key input values are typically 'start' and 'end' dates along with the 'number' of variables to be displayed.

The simplest, and potentially the most useful, Visual Design Special Layer may be a carefully drawn calendar. The calendar may then become a useful Visual Design for date-based Visual Documents.

Temporal analysis is one of the fundamental methods of almost all analysis. Using temporal high density visualizations, users will be able to overlay high density Thematic Layers on well designed Special Layers such as the spiral data visualization shown in the above examples. This analysis can be applied in everything from customer frequency and spend analysis to analysis of the impacts of time of day on the management of a mobile phone network.

It is considered that temporal design patterns are particularly important in terms of analytics as the majority of analytics are time based. Described herein are several examples of producing temporal visual designs.

Non Contiguous Time—For example, weekends can be represented in some interesting ways. The simplest way being not to show them.

Non-linear Time—This allows multiple years of history to be shown where the oldest data is spatially compressed in the Visual Design.

Temporal Special Layers—These can be used to compare quite disjointed types of data. For example, the relationship between external public events, operational payroll sizes and sales revenue. There exists no easy way to numerically join this data together, visually this data can be joined. The technique combines well with simple correlations as it is possible to combine these distinct datasets to show correlations.

Control—One important consideration in visualizing temporal data is the gaining of scientific control. For example, seasonal variables. This is particularly interesting as one year is always different from the next. Quite simply, the start date of each year is never the same as the next, and moving external events such as Easter and 'acts of God' such as weather make precise comparison very difficult.

3. Spatial Visual Designs

One purpose of a spatial visual design is to present an overview of large scale numerical data in one spatial display (i.e. a space) for understanding, monitoring and analyzing the data in relation to a space.

This type of visual design combines together base maps provided by third parties with rendered thematic layers. These "mash-ups" are user definable and accessible to users.

For example, third party base maps may include customer-owned spatial maps or readily available base maps such as those provided by Google™ Maps or Yahoo™ Maps. The system provides powerful thematic layers over one of these spatial base maps.

One example of a spatial visual design is available at www.weather.com[iv]. This map shows two layers—(1) an underlying heat map overlaid with (2) actual temperature at specific cities. The points are useful as the state boundaries allow the user to determine with relative ease which city is being referenced. The underlying heat map is useful as it allows the user to see the overall trend at a glance.

A second example is available at Information Aesthetics[v]. This example shows the travel time from the centre of London outwards using various methods of travel. The use of heat maps here shows very clearly the relationship between distance from the centre of London and travel time.

In a further example, the 'spatial' category of visual design can have retail store location maps, network maps or geographical location maps, such as, for example, maps available from Google™ or Yahoo™

Numerical data may be independently mapped using parameters such as hue, saturation, brightness, opacity and size distributed across a defined geographical space.

Geographic mapping has a wide range of uses. In fact with the wide availability of high quality base maps, the world is becoming spatially enabled. Mapping applications can be used for a huge variety of tasks, from customer relationship management to drive time analysis, site selection to insurance risk analysis and telecommunications network analysis.

4. Textual Visual Designs

One purpose of textual visual designs is to enable business users to interact and query seamlessly from the structured to the unstructured world.

While it is possible to do basic numeric analysis on variables such as hit frequency and number of clicks per hour, the key method is to use a special layer to construct a sensible schematic of the unstructured data then overlay BPDs. Simply put, the described solution will leverage information visualization to bring structure to the unstructured world.

For example, a heat map may be used as part of a textual visual design.

Unstructured textual information is a huge area of growth in data storage and intuitively, the business intelligence industry expects this data to become a valuable asset. The described solution provides information visualization capabilities that overlay and draw out the non-numeric, but actionable, observations relating to unstructured data, in order to link the numeric data warehouse to the unstructured world.

There are a multitude of Special Layers that may be used with textual data. These textual Special Layers extend from building self organizing maps of textual information to diagrams showing the syntax hierarchy of the words used in a document.

A self organizing map (SOM) consists of components called nodes or neurons. Associated with each node is a weight vector of the same dimension as the input data vectors and a position in the map space. The usual arrangement of nodes is a regular spacing in a hexagonal or rectangular grid. The self-organizing map describes a mapping from a higher dimensional input space to a lower dimensional map space. The procedure for placing a vector from data space onto the map is to find the node with the closest weight vector to the vector taken from data space and to assign the map coordinates of this node to our vector— Source: WikipediaError! Bookmark not defined.

5. Virtual Visual Designs

One example of a virtual visual design is a 3D representation of a virtual environment. 3D worlds generate far more accurate and complete data than the real world. As these 3D worlds grow in popularity and become more immersive, the potential for business intelligence tools to be applied to this environment grows significantly.

One example application of the use of a virtual visual design is a retail space analysis tool where transaction data is under-laid as the color of the carpet or shelves. In the case of the shelves, the shelves can also show representations of the products on the shelves.

6. Structural Visual Designs

One purpose of a structural visualization is to illustrate the structure of the data. For example, network topology or interconnection between data elements. The interconnections in the examples below show how a simple Special Layer construct can be used to illustrate quite complex connections.

One example of a structural type visual representation is that of the London underground map. The London underground map is a key historic map showing the schematic topology of the London underground. Using this map travelers can intuitively plan out complex routes and interconnects. Without this visualization, navigating the London underground system would be significantly more difficult and complex to understand.

These structural visualizations are very powerful and are closely related to spatial visualizations. Most of the thematic treatments that can be applied to a spatial visualization are equally applicable to a structural visualization.

Examples of uses for such a visual design type would be for visualizing call routing across a network, electricity grid management and route optimization.

It will be understood that a wide variety of Special Layers may be created in this space. These Special Layers essentially generate the structural schematic from the base data.

Typically the interconnections between nodes are used to generate the structure. One important aspect of the structural Special Layer is building the structure in such a way that interconnect line crossing is minimized.

7. Classical Visual Designs

Traditional charts provide a simple, common and well-established way of presenting data using classical visual designs. However, traditional charts are user-skill dependent and the herein described system may be used to apply guided Visual Design techniques to traditional charts to significantly extend their usefulness.

One example would be to show a line chart of Speed Vs Time in a simple two dimensional line graph. This type of basic graph shows the data clearly and allows the user to observe any geometric trends.

Some common charts that fall into this design category are as follows:
- Scatterplots—Are Cartesian coordinates to show the relation of two or more quantitative variables.
- Histograms—Typically show the quantity of points that fall within various numeric ranges (or bins).
- Bar graphs—Use bars to show frequencies or values for different categories.
- Pie charts—Show percentage values as a slice of a pie.
- Line charts—Are a two-dimensional scatterplot of ordered observations where the observations are connected following their order.

8. Pivotal or Quartal Visual Designs

Different visualization methods have been suggested for high-dimensional data. Most of these methods use latent variables (such as principal components) to reduce the dimensionality of the data to 2 or 3 before plotting the data. One problem with this approach is that the latent variables sometimes are hard to understand in terms of the original variables.

The parallel coordinate (PC) scheme due to Inselberg and others attempts to plot multivariate data in a completely different manner. Since plotting more than 3 orthogonal axis is impossible, parallel coordinate schemes plot all the axes parallel to each other in a plane. Squashing the space in this manner does not destroy too much of the geometric structure. The geometric structure is however projected in such a fashion that most geometric intuition has to be relearned, this is a significant drawback, particularly for visualization of business data.

Pivotal or Quartal visual designs allow the user to display higher dimensional data in a lower dimensional plot by ranking and splitting variables across various axes. This method may for example be used to display 3D data in a 2D plot.

9. Navigational Visual Design

Navigational visualizations use a highly visual interface to navigate through data while maintaining the general context of the data. This data visualization method may use other visual design types so it is differentiated more by the style of how it is used than the implementation standard.

Photosynth for example is a powerful navigational tool for moving between images, its display is designed for navigation of large numbers of linked images.

One illustrative navigational representation example is shown by Ubrowser. This navigational visualization example shows web pages represented in a geometry design. The web pages can be navigated through by spinning the cube shown in the example.

Navigational visualizations are designed for users to interactively move through the data. The objective of the visualization is to present a large volume of data in such a way as to enable users to move through the information and gain an understanding of how the data links together.

A number of display techniques are known for displaying information with regard to a reference image (the combination referred to as primary information). Where the limit of primary information is reached a user may wish to know more but be unable to further explore relevant information. A user may also simply wish to explore other aspects although there is more primary information to explore.

A key element of navigational visual designs is that they are interactive and are designed to assist in data navigation and data way-finding rather than for analytical purposes.

10. Interactive Visual Designs

This classification is for significantly advanced or interactive visual designs which do not fit within the preceding classifications.

These visualizations vary in nature from pure abstract forms to more tangible forms of visualizations. The key difference is that these visualizations may not be classified within the preceding Visual Design classifications due to their advanced nature or interactivity.

Any Visual Design layer considerations will be dependent on the interaction being considered.

There is opportunity to use common associations to provide iconic views of key events; the common associations are created using the interactive tools and asking users for feedback on the relevant icons. This feedback is then developed into a learned interactive system to provide iconic data representations.

Eye movement sensors can be used to control the interactivity and to learn information about relevant icon usage and control interactivity.

A wide range of user interfaces are used in conjunction with computer systems. Generally these are simply used to provide command or data inputs rather than to analyze the underlying behavior of a user in the context of the operation of a software application.

It would be desirable to operate software applications running on a computer on the basis of observed user behavior in the context of a software application.

The following describes a method for the assessment of Visual Design quality. In assessing the quality of a Visual Design the following factors should be considered:

- Alternative approaches—To assess the capability of a Visual Design it is important to contrast it with other visualization methods. In particular one should compare the visual design to a classical graph or table of numbers. This comparison is important as many data visualizations add considerable graphic weight but little informational value.
- Visual simplicity—Looking at a visualization should not overload the mind. The simplicity of the visualization is important as it enhances interpretation and allows common understanding without training. Some visualizations require considerable training to be applied. In general, the described solution will not use these visual designs.
- Data density—the density of data in a visualization is a critical measure of its overall value. Higher density visualizations, if successful in maintaining their simplicity, have considerable potential to increase the flow of information to end users.
- Volume of ink used—Is the visual design using negative space to show key information? This use of negative space allows lower volumes of ink to be used while showing the same or higher density of information. In addition, ink required is generally reduced as the number of "views" or pages of data is reduced to convey the same volume of data.
- Capability to be illuminated with detail—In the end, data visualization becomes information visualization when the specific details are shown. The ability of a visualization to hold detailed information in specific places, often achieved with labels, is a key element in determining its value as an information visualization.

Visual Design Layers

Figure 7:
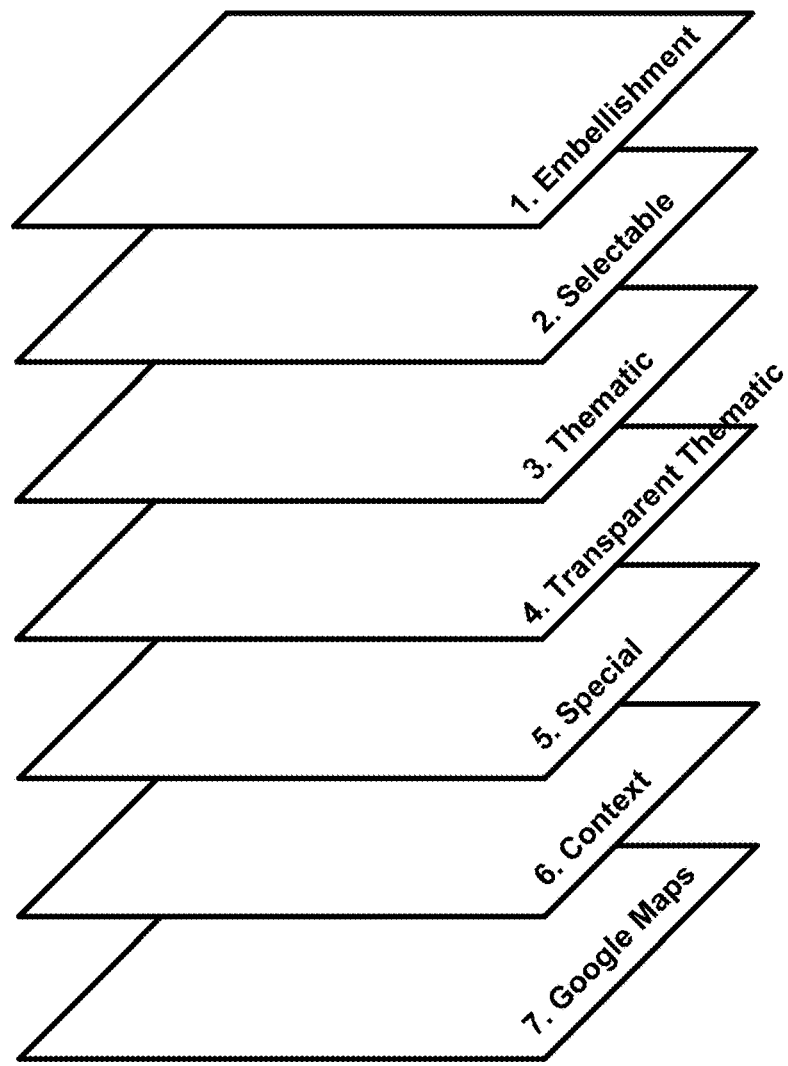
FIG. 7 shows the concept of layers according to an embodiment of the present invention.

There are seven defined Visual Design Layers which are set out diagrammatically as shown in FIG. 7. Other visual design layers may be added as appropriate.

These seven Visual Design Layers are described in the following table:

| Visual Design Layer Type | Description |
| --- | --- |
| 1. Embellishment Layers | Embellishment Layers have labels, symbology and/or other detailed information that is used to illuminate information that is displayed in the lower layers. The overlay can also include controls such as progress bars or spark-lines. |
| 2. Selectable Layers | Selectable Layers are interactive and consist of items that can have associated data. On a retail spatial map it includes store locations as they have associated data. Selectable Layers are typically not obscured by thematic treatments. |
| 3. Thematic Layers | Thematic Layers overlay colors or heatmaps on Special Layers. These thematic treatments become the core visual impact of the final Visual Document. |
| 4. Transparent Thematic Layers | Transparent Thematic Layers are very similar to Thematic Layers (in fact are an alternative). The only difference is that they are graphically merged using a transparent overlay. For example, this kind of layer is necessary to overlay heatmaps on maps.google.com. |
| 5. Special Layers | Special Layers construct the structure of the data. Specifically the Special Layer understands how to automatically draw the data so that other thematic treatments can be applied. Special Layers include mundane layers such as layers of polygons. |
| 6. Context Layers | These are the lowest level of the visualization; they include background maps and other contextual information. |
| 7. Context Map Layers | This is a type of context layer that is rendered from a map such as Google ™ Maps, Yahoo ™ Maps etc. This may be a road map, satellite map or any other map. It is past as a set of tiled images and as such can only be used as a Context Layer. Typically, a Transparent Thematic Layer will be used to display thematic data on a context map layer. |

In terms of the Special Layer, two examples of Special Layers are set out below:

A. Classic Example of Special Layer: Voronoi Diagram
Source: Wikipedia[vi]

In mathematics, a Voronoi diagram, named after Georgy Voronoi, also called a Voronoi tessellation, a Voronoi decomposition, or a Dirichlet tessellation (after Lejeune Dirichlet), is a special kind of decomposition of a metric space determined by distances to a specified discrete set of objects in the space, e.g., by a discrete set of points.

In the simplest and most common case, in the plane, a given set of points S, and the Voronoi diagram for S is the partition of the plane which associates a region V(p) with each point p from S in such a way that all points in V(p) are closer to p than to any other point in S.

A Voronoi diagram can thus be defined as a Special Layer, where a set of polygons are generated from a set of points. The resulting polygon layer can then be subjected to thematic treatments, such as coloring.

B. Non Traditional Example of a Special Layer: Calendar

A calendar can be generated as a Special Layer for display of a temporal visual document. This Special Layer would require a 'start date' and an 'end date', most other information regarding the nature and structure of the Calendar could be determined automatically. The thematic layers would then use the structure of the calendar as a basis for thematic treatments such as coloring and contouring.

In an example from ENTROPIA[vii] a calendar is shown that can be created into a spiral. The structure and layout of this spiral will be the subject of considerable design discussions by information designers focused on issues such as aesthetics and clarity of information. The result of this discussion is a visual design of a spiral calendar Special Layer. This Special Layer can then be used for thematic treatments such as coloring.

Visual Design Types

One specific type of visual design, a spatial visual design, is now described in more detail below. References to the use of a spatial visual design for market basket classification or analysis are also made. It will be understood however that various other forms of visual design, besides spatial visual designs, may be used in conjunction with market basket analysis. For example, temporal visual designs may also be used to show the correlation between time based events.

Spatial Visual Designs

One purpose of a spatial visual design is to present an overview of large scale numerical data in one spatial display (i.e. a space) for understanding, monitoring and analyzing the data.

GIS and mapping tools have been part of business analytics for over 10 years. Syed Nasirin[viii] states:

"In retailing, GIS is also known as "geodemographics." It is derived from the combination of both geographic and demographic terms. The system was initially employed to support site selection decisions, but has developed to support an array of marketing mix decisions. As GIS 're-engineers' the traditional working approaches and involves continuous commitment from all the parties (senior managers, system developers and users) in the organization, the system fundamentally changes the existing organizational working approach towards site selection and other marketing mix decisions."

Nasirin's statement illustrates the common kinds of uses of GIS for site selection and geodemographics.

The described solution is a next generation of thematic mapping. It mashes together the base maps provided by third parties with rendered thematic layers. These mash-ups are user definable and accessible to users.

Third party base maps may include customer-owned spatial maps or readily available base maps such as those provided by Google™ Maps or Yahoo™ Maps. The system provides powerful thematic layers over one of these spatial base maps.

One example of a known spatial visual design is available at www.weather.com[ix]. This map shows two layers—(1) an underlying heat map indicating a range of temperatures over a land mass (the USA), which is then overlaid with (2) actual temperatures for specific cities. The points are useful as the US state boundaries allow the user to determine with relative ease which city is being referenced. The underlying heat map is useful as it allows the user to see the overall trend at a glance.

A second example of a known spatial visual design is available at Information Aesthetics[x]. This example shows the travel time from the centre of London outwards using various methods of travel. The use of heat maps here shows very clearly the relationship between distance from the centre of London and travel time.

Numerical data may be independently mapped using parameters such as hue, saturation, brightness, opacity and size distributed across a defined geographical space.

Geographic mapping has a wide range of uses. In fact with the wide availability of high quality base maps, the world is becoming spatially enabled. Mapping applications can be used for a huge variety of tasks, from customer relationship management to drive time analysis, site selection to insurance risk analysis and telecommunications network analysis.

The described solution provides a flexible way that users can add geographic queries and analysis to their internal EDW (Enterprise Data Warehouse) applications. These can be further extended with the powerful animation capabilities of the described solution. This animation capability enables the extension of the spatial analysis to space/time analytical solutions.

Affinity analysis is a data analysis or data mining technique that is used to discover the degree of correlation among transaction attributes of specific items being analyzed. One such type of affinity analysis is market basket analysis or correlation.

For example, retailers may use market basket analysis in order to provide an increased understanding of the purchase behavior of groups of customers. The results of this analysis may then be used by the retailer to adapt their business, for example by applying cross-selling techniques, redesigning their store layout or design, as well as providing appropriate discount plans and promotions.

In prior known market basket analysis, association rules are developed between the transaction items being analyzed. Then, for each association rule, a percentage value is calculated for the support and confidence of that rule.

The support value is the percentage of the number of transactions that fit the association rule out of the total number of transactions. For example, if, out of 10 shopping baskets that were analyzed, 7 out of the 10 shoppers purchased both products A and B then the support value would be 7/10 or 70%.

The confidence value is the percentage of the number of transactions for a specific combination of two items out of the total number of transactions involving a specific one of those items. For example, if 4 shoppers who bought product A also bought product B, where 7 shoppers in total bought A, the confidence value is 4/7 or 57%.

The support and confidence values (factors) give an indication of the accuracy and usefulness of the association rules. Typically, when analysts look for pertinent or relevant rules, they look for rules generating at least 50% support and 80% confidence levels.

By setting a threshold that is acceptable to the user for each of the support and confidence values, the user is able to determine from the analysis which of the associations are more relevant.

When analyzing a number of transaction items, the number of combinations of the interaction between each item rises exponentially as the number of items increase. For example, if there are only two items to analyze, item A and item B, then there are only two possible association rules associated with these two items.

1) A is associated with B
2) B is associated with A

Whereas, if there are three items, the number of possible association rules increases to twelve as follows:

1) A is associated with B
2) A is associated with C
3) A is associated with (B and C)
4) B is associated with A
5) B is associated with C
6) B is associated with (A and C)
7) C is associated with A
8) C is associated with B
9) C is associated with (A and B)
10) (A and B) are associated with C 11) (A and C) are associated with B
12) (B and C) are associated with A The equation for calculating the number of association rules is as follows:

$$R = 3^d - 2^{d+1} + 1$$

Where R=total number of association rules, and d=the number of distinct products.

Therefore, because the number of different transaction items in a real world situation may be in the tens or hundreds of thousands, known algorithms for performing market basket analysis are typically limited by removing or ignoring a large portion of the transaction items from the analysis to avoid combinatorial explosions. For example, a supermarket may stock 100,000 or more line items, and this clearly would involve far too many combinatorial expressions to take into account.

A further difficulty with known techniques is that a large number of the relationships found may be trivial for anyone familiar with the business. Although the volume of data has been reduced, a user may be trying to find a needle in a haystack. Requiring correlations to have a high confidence level risks missing some exploitable results.

The visualization tools described herein enable a user to understand and explore relationships between market baskets in an intuitive manner.

Embodiments of the present invention are described herein with reference to a system adapted or arranged to perform a method of detecting and representing correlations within data (or categorizations of data) and enabling interaction between the represented correlated or categorized data and a hierarchical representation of the data.

In summary, the system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language. Further, the program instructions may be stored in any suitable manner such that they can be transferred to the memory device or read by the processor, such as, for example, being stored on a computer readable medium. The computer readable medium may be any suitable medium, such as, for example, solid state memory, magnetic tape, a compact disc (CD-ROM or CD-R/W), memory card, flash memory, optical disc, magnetic disc or any other suitable computer readable medium.

The system is arranged to be in communication with external data storage systems or devices in order to retrieve the relevant data.

The term market basket in this application may refer to the traditional market basket wherein a number of transactions or transaction items are grouped together according to a particular criterion. For example, the market basket may be a group of consumer items that are purchased by a plurality of single consumers. Alternatively, for example, the market basket may be associated with a higher level, wherein it is associated with a group of consumer items that are purchased by a plurality of groups of consumers, where the groups are identified by a certain common factor, such as age, sex, ethnicity etc.

The term market basket in this application may also refer to a collection of data transactions, such as, for example, manufacturing data, test data, quality measurement data, power measurement data, environmental data, productivity data, or the like. These data transactions may be associated with one or more items, where those items are, for example, a product being manufactured, a manufacturing plant, employees, managers, base materials, machinery items, test stations, production lines, energy supply units, transport link facilities, storage facilities, or the like. Therefore, as an example, a market basket may consist of a number of data transactions for a number of products made on different production lines at different times.

The tools described herein enable a user to analyze and recognize the correlation between relationships of transaction items without the need to rely on the processor intensive calculation of association rules between all transaction items, or the need to remove or ignore large amounts of data associated with the market basket of transaction items that may otherwise provide some insight on interrelationships between the items.

Methods and visualization tools are herein described that enable users to have a greater understanding of relationships between transaction items and explore those relationships via an interactive graphical interface.

Methods and visualization tools are herein described that enable users to alter the physical layout of transaction items to optimize results. The user may interact with the new physical layouts in physical or 3D simulated worlds. In the physical or real world the user may overlay display information onto their interaction with the physical changes. These overlays include heads up displays or other forms of special viewing devices.

In a preferred embodiment all correlations between all market baskets (groups of transactions or transaction items) for all transaction attributes are determined. It will however be understood that great benefits may also be derived when only a subset of market baskets and/or a subset of transaction attributes are analyzed using the herein described methods, and that the methodology described herein provides significant advantages over the prior art. By looking at all correlations a user can be presented with correlations that they may not have even considered exploring to reveal unexpected insights. However, where resources (such as financial computational or time resources) are limited, a subset of correlations may still reveal useful information that otherwise would not have been found using standard techniques.

As a first step, the transaction items (e.g. products sold in a retail outlet, telecommunication services, vendible items or other measurable data associated with specific items) are correlated or dimension reduced for one or more different transaction attributes (e.g. location of the transaction, time of the transaction, or attribute of the item such as category, branding, market segment etc.). That is, the transaction items are classified using a dimension reduction, correlation or classification method.

In the example provided below, the system creates a self-organizing map to reduce the number of dimensions associated with the transaction items. It will be understood that the "reduction of dimensions" is a term that equates to the "unfolding of dimensions", wherein multi dimensional data is represented in lesser dimensions without any significant loss of the inter relationships between the transaction items. For example, the reduction of a 3d globe of the earth to a 2d map representing the earth has reduced the dimensions, or unfolded the dimensions, of the items (e.g. topography) on the globe but without losing any of the interrelationship information of the items (e.g. distance and relationships between cities and countries).

It will be understood that the system herein described includes one or more elements that are arranged to perform the various functions and methods as described herein. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein, and that certain modules or engines may be combined into single modules or engines.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data visualization computer, a database query computer, a graphical analysis computer, a retail environment analysis computer, a gaming data analysis computer, a manufacturing data analysis computer, a business intelligence computer etc., where the computer has been specifically adapted to perform the described steps on specific data captured from an environment associated with a particular field.

Figure 10A:
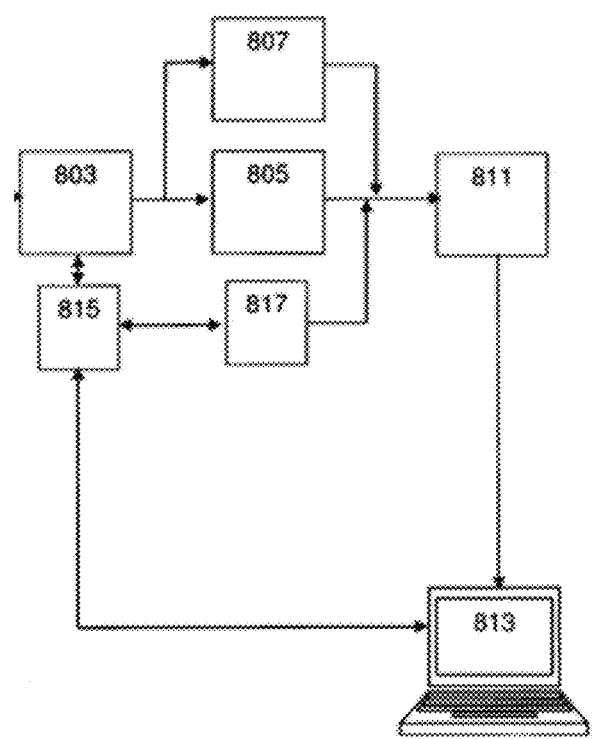
FIG. 10A shows a system block diagram according to an embodiment of the present invention.

FIG. 10A shows a system block diagram showing the various modules that perform these method steps.

A data storage module is in communication with a data retrieval module 803.

The data provided as an input to the system may be of any suitable type of data, for example, real world data including, but not limited to, gaming or gambling data associated with a gaming environment such as a casino, event data, test or quality control data obtained from a manufacturing environment, business data retrieved from an accounting system, sales data retrieved from a company database, etc. All this data may be received by the system in real time in a cache memory or may be stored in a more permanent manner.

The data retrieval module is configured to enable the retrieval of data from the data storage module, which is in communication with the system. The data storage module may be any suitable type of data storage system. For example, it may be an enterprise data warehouse (EDW), a data mart, a database, a storage array or any other suitable device or groups of devices that can store data for later retrieval. Further, the data storage module may be a cache memory used to temporarily store The data retrieval module 803 is also in communication with a dimension module 805, tree module 807 and selection detection module 815.

The outputs of the dimension module 805 and tree module 807 are communicated to a rendering module 811, which outputs the rendered image to an output module 813, such as a display module.

As an alternative to, or in conjunction with, the display module, further output modules may be provided to output the results of the rendering module. That is, the raw data retrieved by the data retrieval module is analyzed and converted to provide output data in a specific format. The output data is provided to the display and/or further output modules to enable a user to visualize the raw data in a manner that conveys more useful or hidden information that would otherwise be lost.

The further output module may be a printing device in communication with the described system to receive print control data so that representations of the data may be printed on any suitable print medium. Alternatively, the further output module may be an interface that enables the data output from the rendering module to be interfaced with other data handling modules or storage devices. As a further alternative, the output module may be the same or different data storage module as described above.

The selection detection module 815 is in communication with the output module 813 to enable the detection of a portion of the rendered output. Further, the selection detection module 815 is in communication with a highlight module 817 which communicates with the rendering module 811 to highlight the selected portions of the rendered output.

It will be understood that any suitable dimension reduction, correlation or classification method may be performed by the dimension module 805 as a first step in the herein described methodology and that the invention is not limited to only the use of self-organizing maps.

A self organizing map automatically reduces the number of dimensions of the transaction items being displayed. The map will also automatically group together similar data sets to provide a visual representation of the correlation between the data sets.

In this embodiment, the self organizing map is created by a SOM module forming part of the dimension module 805 as described below. It will however be understood that other alternative methods may be carried out to produce the same or similar results required to implement embodiments of the invention.

Each of the market baskets is randomly arranged by the SOM module to locate at a particular point on an X-Y scatter plot or map. The plot has a predefined number of points at X-Y co-ordinates where the number of points is less than the number of market baskets that are being analyzed. For example, the plot may be a 16×16 plot, with 256 points, whereas the number of market baskets is more than this, and may be in excess of 100,000.

As an alternative, the market baskets may be systematically arranged on the plot or map by the SOM module. For example, by applying them to the first row according to the chronological order that the market baskets are received until the first row is full, and then applying them to subsequent rows until all rows are full. The process is then repeated by the SOM module until all market baskets have been applied to the plot or map.

This process therefore creates an unarranged X,Y scatter plot, where each market basket is associated with or contains a plurality of transactions. These transactions define most of the dimensions associated with the transaction items, and may also, or alternatively, include other factors such as demography. On a self organizing map the X and Y axis merely represent a separation in terms of "distance" between items, and do not mean anything in a typical dimensional sense. Therefore, items that end up being placed close to each other in a SOM are generally correlated.

The map created at this stage is merely a random or systematic arrangement of baskets without any correlation between the baskets.

The next step by the SOM module is to gradually re-arrange the positioning of the baskets on the map so that correlated baskets are positioned closer together and non-correlated baskets are moved further apart.

For each basket, the SOM module re adds the basket to the scatter plot or map, and the map is adjusted so that the items in the new layout in the scatter plot are mathematically closer together. All surrounding points are also slightly adjusted.

This step is carried out for each of the baskets, and then repeated until the arrangement (or network) stabilizes, i.e. until the arrangement of baskets correlates.

At this stage, the information that is graphically represented doesn't convey much information, although the market baskets are arranged in a correlated manner.

In order to allow the user to fully understand the relationships between the market baskets, a tree structure is created and graphically displayed by a tree module. A tree overlay is placed as a layer over the map or plot.

In this embodiment, a first tree structure created by the tree module is an R-tree. The purpose of the R-tree is to provide a balanced hierarchical view where the groupings provided by the tree convey an easily understandable message to the user. Also, the groupings provided by the tree relate back to the self-organizing map.

In this embodiment, a number of boxes (polygons) are graphically laid over the self organizing map by the tree module so as to split the market baskets up into relevant classifications or categories. For example, the market baskets may be classified any number of ways such as, for example, according to values from high value to low value, or may be classified according to error rate from high error rate to low error rate.

Any suitable type of classification or grouping may be applied to the self organizing map that enables the user to more easily understand the groupings of the market baskets.

Each layer of the R-tree may have, for example, 50 boxes that are graphically represented on the self organizing map. It will however be understood that the number of boxes may be increased or decreased depending on the user's requirements.

In this embodiment, each layer of the R-tree has 10 different boxes that are placed over the self organizing map in order to categorize the market baskets. The boxes may be overlapping. It will be understood that there may not be a single suitable arrangement of the R-tree boxes and that different alternatives may be produced based on the user's requirements. However, as a general rule, the boxes are arranged so as to classify or group the market baskets in the most efficient manner possible.

This results in ten boxes being graphically represented on the self organizing map covering all of the market baskets.

It will be understood that as an alternative, the use of boxes or polygons may be replaced with the use of any other shape. For example, the shapes may be organic shapes that are changed to fit over the self organizing map in the most efficient manner.

The next step is to repeat the above process for each individual box. This would, for example, provide 100 smaller boxes, i.e. 10 smaller boxes are arranged within each of the ten larger boxes. This provides a higher level of categorization.

The step is then repeated a further time to produce, for example, 1000 even smaller boxes, i.e. 10 even smaller boxes are arranged within each of the 100 smaller boxes. This provides a further successive higher level of categorization.

The R-tree boxes are also graphically represented by the tree module using a textual hierarchical tree 1109. Each of the boxes is described in terms that allow the user to understand why it is different from other boxes, for example, by labeling a high value box, etc.

The user is then able to easily understand the relationships shown on the textual tree. A selection detection module detects when a user selects any branch, node or group of nodes on the textual tree. The selection is detected by the selection detection module and the associated R-tree box or boxes are identified or graphically highlighted by a highlight module on the self organizing map. As the tree relates to the self organizing map that has correlated similar market baskets, this provides valuable information on how the transaction items in the market basket correlate with each other. This therefore provides interactivity between the tree hierarchy, R-tree representation and SOM. It will be understood that the system may allow a user to select any one of the textual tree, R-tree or SOM portions of the representation and subsequently highlight all other related portions associated with the selection.

Therefore, this system uniquely provides an interaction between a method of graphically displaying high dimensional data at lower dimensions and a tree classification mechanism, which thus enables a user to identify correlated data transactions within the graphic. That is, the system provides a synergistic relationship between the graphical representation of a dimensionally reduced or classified data set and a tree representation of the data set to enable a user to more easily understand any relationships within the data set.

Figure 10B:
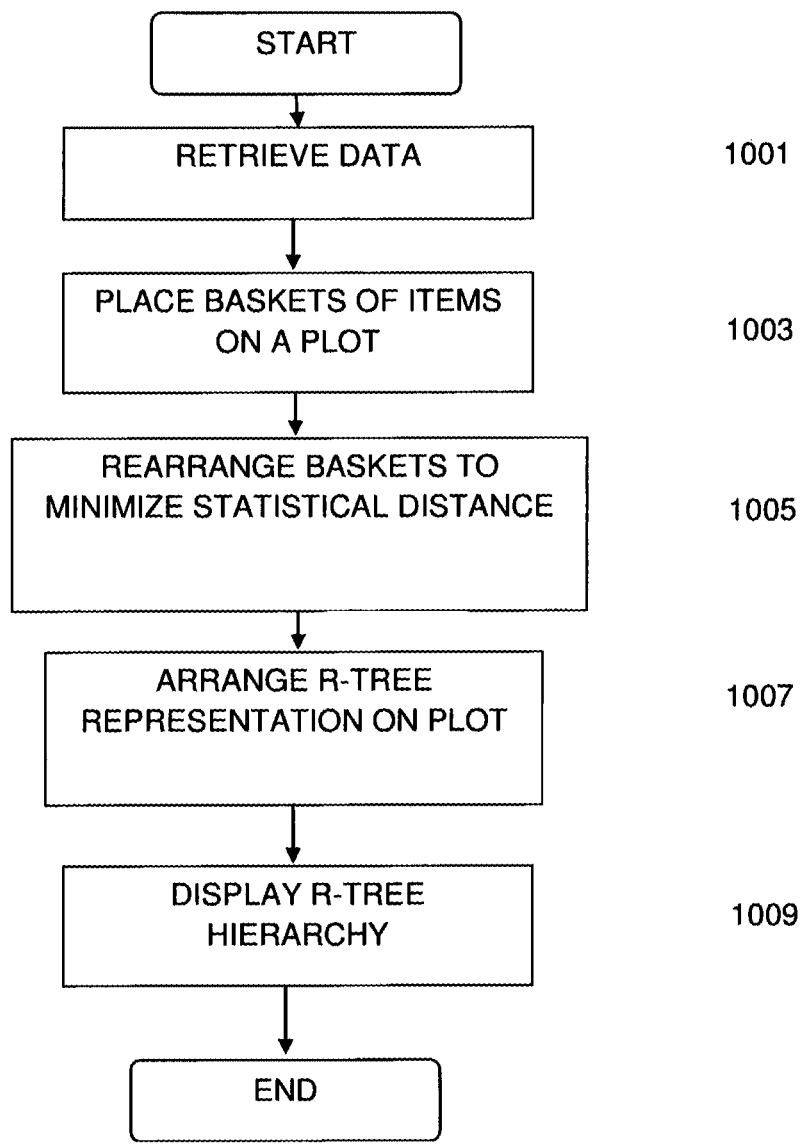
FIG. 10B shows a flow diagram of a dimension reducing and correlation method according to an embodiment of the present invention.

Referring to FIG. 10B, a flow diagram is provided to indicate some of the key steps in this methodology.

At step 1001, the data is retrieved by the data retrieval module from the data storage module (data store). The data store may be a local or remote store and the data may be retrieved using any suitable method, such as wireless or wired transmission mechanisms.

Baskets of data are then randomly placed by a self organizing map (SOM) module on a plot in step 1003. In step 1005, the baskets are re-arranged by the SOM module in the graphical representation to minimize the statistical distance between the baskets. This step is the self-organizing step as discussed above and is repeated by the SOM module until the map stabilizes.

In step 1007, an R-tree representation of the data is graphically represented using the tree module as an overlay of the self organizing map. In addition, at step 1009, a hierarchical tree is displayed on the graphical representation, where the tree is a representation of the R-tree hierarchy.

Figure 11:
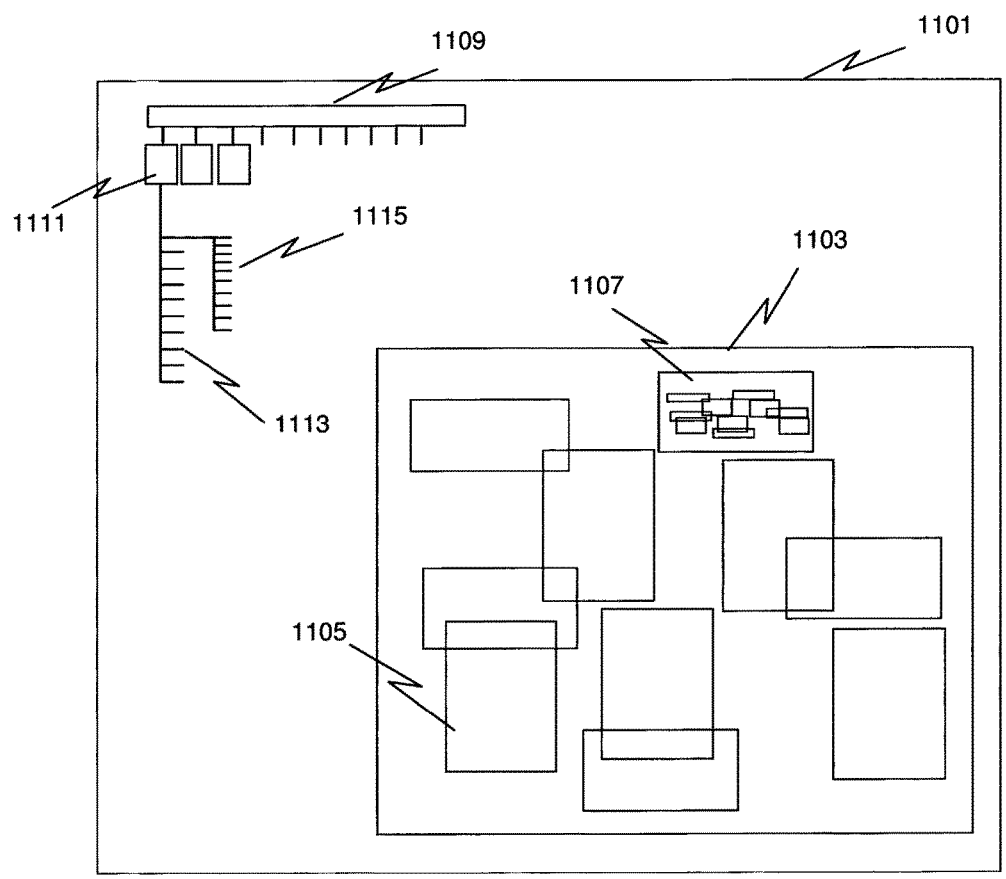
FIG. 11 shows a self organizing map with an R-tree representation according to an embodiment of the present invention.

Referring to FIG. 11, the elements of the graphical representation are shown. That is, in the graphical representation 1101 is a self organizing map 1103. For clarity reasons, the details of the self organizing map are not shown, but it will be understood that the map will provide an indication of the baskets of transaction items in a correlated manner. Placed over the self organizing map is the R-tree representation formed from ten boxes 1105, some overlapping, some not. Within each of the ten boxes a further ten boxes 1107 are provided. For clarity reasons, only one of the larger ten boxes is shown to have a further ten boxes therein, and the ten boxes within each of the smaller ten boxes are not shown. The boxes are arranged to provide an efficient fit over the baskets of transaction items.

A graphical representation of the hierarchy of the R-tree 1109 is also generated and displayed. The R-tree hierarchy includes the larger ten boxes at the top of the hierarchy 1111, the boxes at the next size down in the next level 1113, and the smaller boxes at the next level 1115.

Figure 8:
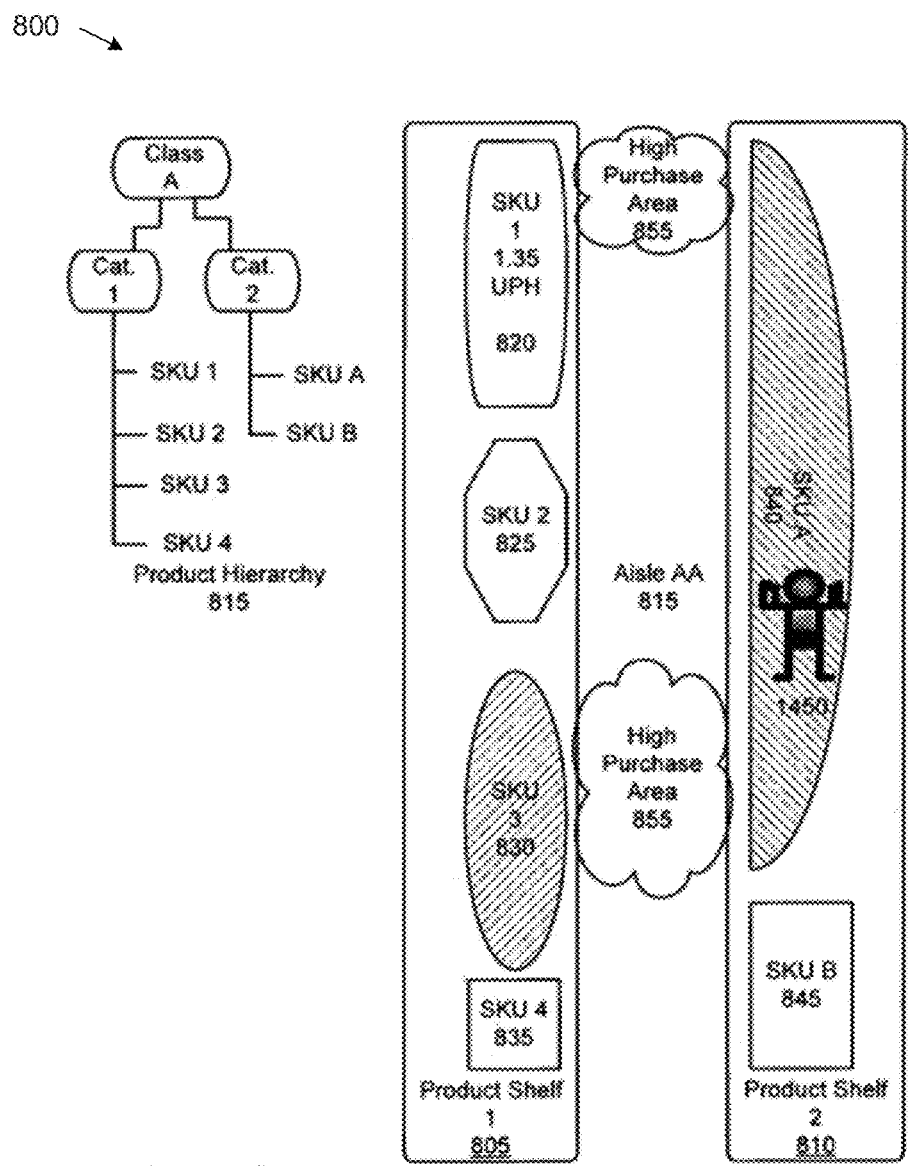
FIG. 8 shows a location based heatmap according to an embodiment of the present invention.

A further detailed example is provided in FIG. 8 where a tree module uses a classification module to perform a classification method instead of a self organizing map to reduce the computational analysis required. The classification is displayed by the tree module in a hierarchical representation such as the hierarchical tree representation 815 shown in FIG. 8. This provides the user with a hierarchical index of transaction items with the nodes forming categories that can be labeled by a user.

The nodes may alternatively be labeled automatically based on the data associated with the transaction items in the node. The automatic labeling may, for example, be determined from any meta data associated with the transaction items, this meta data being retrievable from a meta data library or other storage system.

Each of the nodes or levels in the tree are represented by the tree module in a specific area within the layout of a department store 800. When a user selects a specific node or layer in the tree, the relevant associated area within the graphical representation of the store may be highlighted. For example, selecting the branch in the tree that represents SKU A (Stock Keeping Unit A) causes the selection detection module to detect the selection, which then instructs the highlight module to instruct the rendering module to highlight the relevant portion of the representation associated with SKU A 840.

Correlation information can be arranged to overlay a map of transaction attributes in the form of a heat map. In FIG. 8 a location based heat map is created by a dimension module for display in the form of a department store 800 having product shelves 805 and 810 containing products 820, 825, 835, 840 and 845. That is, in this example, the transaction items are products that the department store sells, and the transaction attributes are the location or position of those items within the store. The items on the heat map are color coded by the dimension module according to the number of sales of those items. This provides an immediate indication of which items are more popular to shoppers.

In this example, the map is not self-organized, but instead the transaction items are classified by the tree module according to their location in the store, as indicated by the tree classification product hierarchy 815.

In FIG. 8 refers to a categorization that has been overlaid over the spatial map. This categorization may be represented in the spatial view 800 as polygons overlaid over the purchase areas. For illustrative purposes this could be considered to be 805 and 810, but the categorization can extend over multiple shelves and is not bound by the spatial layout. The high purchase area 855 in FIG. 8 is equivalently represented by the higher levels of categorization shown in FIG. 11 on 1107. This shows how the high purchase areas may require further levels of categorization.

The system determines where on the heat map high purchase value or volume areas 855 are located based on the number of sales of each item on the product shelves. The area to be highlighted is determined by the dimension module detecting a correlation between two or more products (transaction items). The products associated with the high purchase volume are then highlighted by the highlight module in the graphical display to indicate to the user which products are responsible for the area being a high purchase area. As can be seen in FIG. 8, products 830 and 840 are highlighted to show that they are likely to be a reason the area indicated 855 is a high purchase area.

In this embodiment a basket consisting of products 830 and 840 is highlighted as a correlation threshold has been exceeded and detected by the dimension module. This threshold may be a magnitude, frequency, time or business performance threshold which may be varied and selected by a user.

All correlations between transaction items may be displayed in a more complex heat map. A user may then explore areas of interest by clicking a cursor on the area etc which is detected by the selection detection module. Alternatively, the user may select a product listed in the hierarchy rather than on the spatial map, and upon selection and detection by the selection detection module, the relevant product will be highlighted in the map by the highlight module.

In one example, when a user clicks on product 840 an icon 850 (in the form of a man) may be revealed by the system to show that men are the main purchaser's of the item. Other or additional supplementary information in numerical, literal or visual form may be displayed as a user explores a region of the heat map or hierarchical data. Further detailed information upon which the heat map has been generated may also be displayed by the system.

Information obtained from such analysis may be used to optimize store layout, understand sales associations, supply chain management, marketing campaigns, market segmentation, shrinkage or optimize stocking. Other examples of how the analysis herein described may be used are provided below.

It will also be understood that the system may be arranged to visually represent the data in the form of both a spatial map, as in FIG. 8, and a SOM, as in FIG. 11. In such an example, the system will visually represent the relevant component parts of the representation through interactivity with the representation. That is, selecting areas of any view results in the selection being shown in the corresponding views. For example clicking on the hierarchical view will typically highlight the spatial map and/or the self organizing map and vice versa.

It will be understood that this methodology can equally apply to environments other than retail environments, such as, for example, manufacturing and/or testing environments, entertainment environments, gaming or casino environments, financial service environments, telecommunications environments, hospitality environments, travel environments, Internet web production, analysis environments, and the like, etc.

For example, the system herein described may be utilized in a manufacturing environment. It will be understood that the same modules used and described in the above example may also be used in this example.

Within an example manufacturing environment there may be several production lines for preparing, assembling or testing a product, where the products and production line environment is being monitored by various devices. The monitoring devices may automatically capture and feedback data associated with various attributes to a main computing device that stores the data. For example, the attributes may include test data measured by a device that tests individual products, environmental data measured by an environmental detection system associated with the individual work stations, personnel data, stock data, product data, temporal data, location data, etc.

Figure 9:
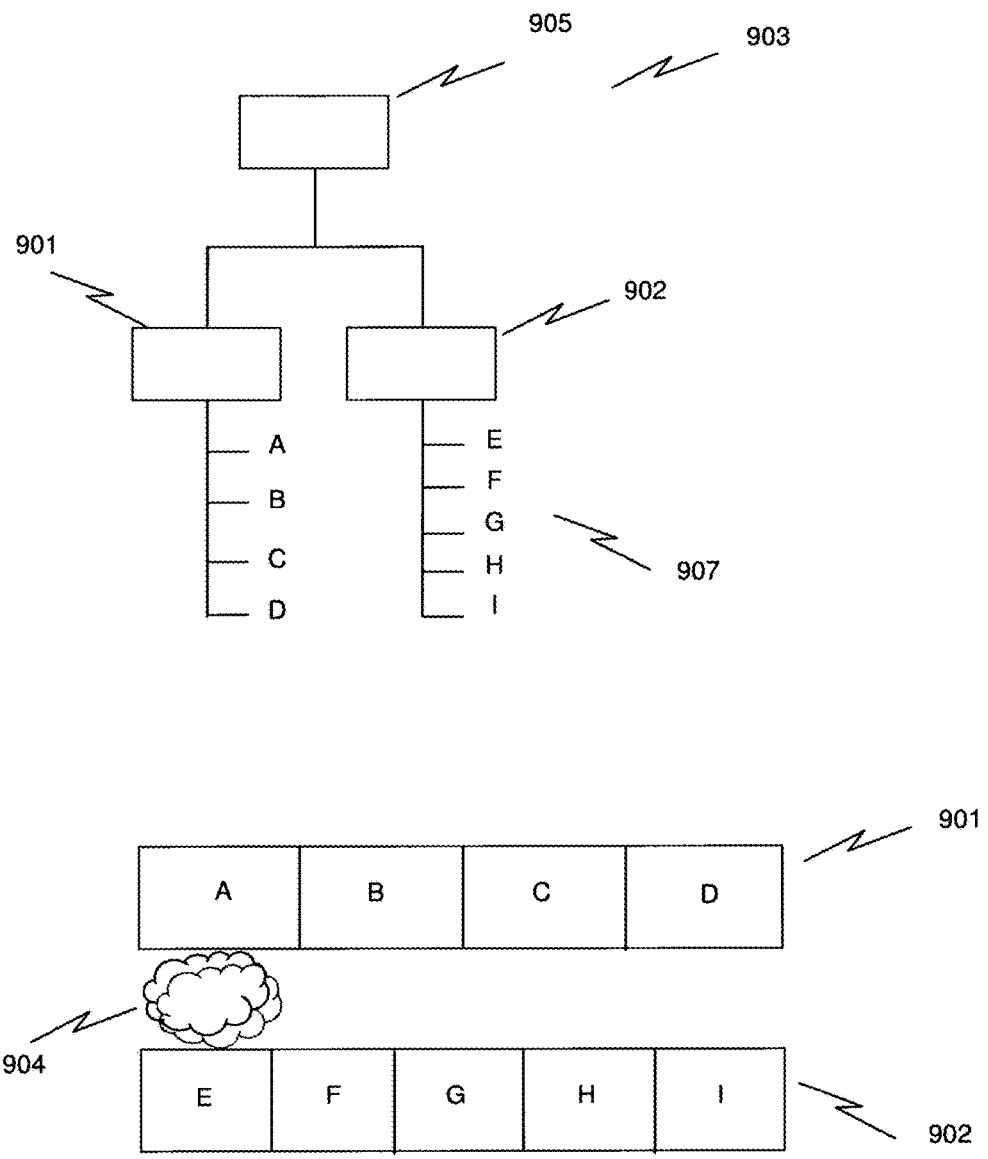
FIG. 9 shows a further location based heatmap according to a further embodiment of the present invention.

In the manufacturing environment, a number of personnel assemble products at a number of workstations on each production line. For example, referring to FIG. 9, a heat map of production line 901 and production line 902 is provided. However, the manufacturing environment may include thousands of different production lines at many different locations. Production line 901 has 4 workstations with 4 personnel A, B, C and D. Production line 902 has 5 workstations with 5 personnel E, F, G, H and I. A quality assurance system in place detects the errors on the products emanating from each of the work stations using any suitable technique for measuring, gathering and storing test data. For example, a product once assembled may be manually or automatically tested to see if it operates or is manufactured within a set tolerance value. If not, an error code associated with the product (and so associated with any attributes for that product) may be generated by the testing system along with data that associates the error code with a particular product, production line, and work station. This information or data is fed back to the computing system for storage and analysis.

Therefore, data is gathered for a number of products and the data is grouped into baskets according to the work station the product is produced on. Alternatively, it will be understood that the market basket may be arranged according to the individual employee, manufacturing plant, the time products are manufactured, or any other suitable grouping for example.

When the herein described system analyzes any measured errors using the techniques described above, the error rates for work stations A and E are found to be particularly high. Therefore, work stations A and E are located close to each other on the self organizing map.

An R-tree hierarchical representation 903 is graphically arranged on the visual representation. For each product 905, the relevant production lines (901 & 902) are displayed. Under each relevant production line, the associated work stations 907 are listed. Therefore, the physical layout of the manufacturing environment is also displayed in a hierarchical manner.

A manager, for example, may highlight the production line 901 and production line 902 on the R-tree hierarchical representation 903. The high error rate is then highlighted 904, or indicated in any suitable manner, on the graphical representation of the production lines 901 and 902 through the analysis of the data associated with each of the production lines and/or work stations and/or products. The user is thus able to analyze the baskets for the highlighted work stations A and E to determine the reason for the high error rate. This insight may result in physical changes to the layout of the manufacturing process.

The error rates on products emanating from these two locations may be down to any number of different factors or attributes. For example, the base materials being supplied to these two work stations may come from a common supplier or batch, and those base materials may be inferior compared to the others being supplied to the other work stations. Alternatively, the environment at that location may be unusually hot or humid due to other machinery in the area. Also, the error rate may be as a result of the individual characters working at the work stations and their social interaction. Of course, if the personnel working at the work stations are continually moving to different work stations, then social interaction is unlikely to be the issue, and so something associated with the more permanent environment of the work stations or supply of goods to the work stations is more likely.

All of the data discussed in the above example, such as the error rates, work station positions, environment details, for example, may be retrieved and stored automatically using any suitable known communication, storage and analysis techniques and using known computing retrieval and storage techniques.

The system described herein utilizes captured data in a unique manner in order to classify or dimensionally reduce data collected and determine any correlation in the data for any number of different attributes. The classified or dimensionally reduced data is then represented using a tree structure in a visual design as part of a graphical representation. The graphical representation can be used by the end user (for example, the production manager) to analyze and view how the manufacturing process is operating and so enable the user to make any necessary changes based on the analysis. For example, the user may adjust the environmental controls for the production environment, the supply of materials, the arrangement of personnel, the position or configuration of the production lines, etc.

The changes may be made by the user in an interactive manner. For example, they may select a portion of the graphical representation (e.g. the manufacturing environment layout) and interact with it to change certain variables, such as the environmental conditions or materials supplied, that are associated with any of the work stations or products. For example, a user may select the correlated work stations that have an increased error rate, and upon selection (for example via a touch screen) be provided with a list of variables retrieved from a database that are associated with those work stations and that can be changed for those work stations. By selecting any or all of these variables, the user has full intuitive control over the manufacturing environment using a detailed graphical analysis tool.

The example described above equally applies to an automated production line, where the detection of errors local to a particular point on two production lines could point to an environmental situation causing the errors. For example, the detection of a co-existence of errors at two closely located positions in a production line, may be due to an increase or decrease in operating temperature at that point causing the tolerances being applied to a piece of equipment being altered in such a way that it affects the finished product.

Further, a similar methodology may be applied to a temporal situation. For example, the time at which certain errors occur may be recorded and analyzed in a similar manner to determine a correlation between different work stations, environments, personnel, factories, procedures, materials, working shifts etc.

Therefore, it can be seen that this methodology can be used to improve production environments, increase quality control, improve manufacturing processes, reduce energy expenditure as well as provide various other technical advantages.

Figure 12:
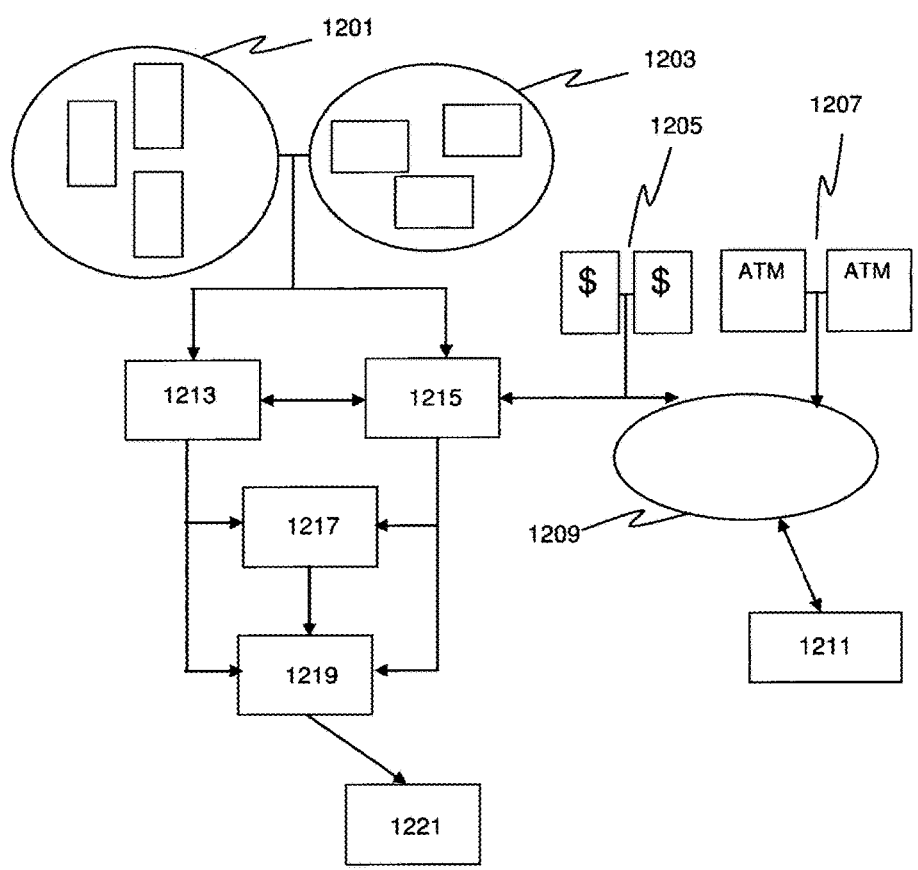
FIG. 12 shows a gaming environment system block diagram according to an embodiment of the present invention.

Further, the above described methodology may be applied to a gaming environment as depicted in FIG. 12.

FIG. 12 shows an example of how the herein described system may be incorporated within a gaming environment. The gaming environment consists of a number of gaming machines 1201 and electronic tables 1203 (among other electronic gaming devices) that are adapted to communicate electronically with other systems using any suitable protocols, such as data packet protocols.

The gaming environment further includes a number of electronic cashier devices 1205 and ATMs 1207 which are in communication via a Wide Area Network 1209 with one or more financial databases 1211.

Data from the gaming machines 1201 and electronic tables 1203 are transferred to a reward program database 1213 and customer database 1215. It will be understood that these two databases may be combined into a single database.

Data from the cashier devices are also transferred to the reward program database 1213 and customer database 1215. The databases 1213 and 1215 are in communication with a central hotel management system 1217 that oversees the operation of the gaming environment, including the activities of customers in other areas of a casino, such as shops, hotels, spas etc.

The various modules of the system 1219 described herein are in communication with the reward program database 1213, customer database 1215 and central hotel management system 1217 so that the system can retrieve all necessary data about the activities within the gaming environment. The various embodiments as described herein are employed by the system 1219 to provide an output 1221.

There are some well known thematic treatments for spatial maps; these include coloring, gravity modeling, and graduated symbols, all of which may be applied to the system as herein described. These different thematic treatments forming a part of the described solution are well documented elsewhere, and therefore not repeated in this document. References can be found at Wikipedia[xi].

There are opportunities for Special Layers that address specific business areas, for example specific visualization methods relating to the use of RFID inside retail stores or mapping movement of people using tracks generated from face recognition and tracking systems. For example, individuals may be tracked in order to analyse behavioral aspects of different groups in different environments. Groups may be determined using face recognition techniques in order to reduce the data set from, for example, 10,000 individuals into several groups, such as by age, sex, height, weight etc. Correlation values for various attributes of the individual groups can be graphically represented on a map (for example, a shopping mall layout). The attributes are numerous and could include for example, the number and type of products bought in one retail outlet, the amount of time browsing in different types of outlets, the speed traveled between certain outlets, etc.

Therefore, the data visualization techniques described herein transform the raw data received into different visual dimensionally reduced and/or correlated arrangements to enable further or hidden information within the raw data to be visually represented and interacted with in a manner that conveys the information to a user in an efficient manner.

| Term | Glossary Definition |
|---|---|
| Agile Development | Agile software development is a conceptual framework for software engineering that promotes development iterations throughout the life-cycle of the project. There are many agile development methods; most minimize risk by developing software in short amounts of time. Software developed during one unit of time is referred to as an iteration, which may last from one to four weeks. Each iteration is an entire software project: including planning, requirements analysis, design, coding, testing, and documentation. An iteration may not add enough functionality to warrant releasing the product to market but the goal is to have an available release (without bugs) at the end of each iteration. At the end of each iteration, the team re-evaluates project priorities. Wikipedia[xii] |
| BPD Packages | A BPD Package is made up from a set of related BPDs. This relationship (between a BPD Package and its BPDs) is defined using metadata. BPD Packages can be thought of as the Visual Document's vocabulary. |
| Catalog | The described catalog is used to store permanent and temporary objects that are necessary for creation and storage of Visual Documents. These may include Visual Designs, BPDs, Configuration tools and other objects. There may be multiple catalogs of different types (such as database, flat file) which are configured by an integrator dependent on customer requirements. All items in a catalog are identified by a unique ID and can only be accessed by those with the correct authorization. |
| Data Packages | Data Packages contain data that can be sold with subscription or service provision including an associated managed dataset. For example, census data will be available as a Data Package; this Data Package will enable the described solution users to interact and use a slowly changing dataset called census. (Census data can be updated after each census and is often modeled between each census). |
| Dimension | Dimensional modeling always uses the concepts of facts (sometimes referred to as measures) and dimensions. Facts are typically (but not always) numeric values that can be aggregated, and dimensions are groups of hierarchies and descriptors that define the facts. For example, sales amount is a fact; timestamp, product, register#, store#, etc. are elements of dimensions. Wikipedia[xiii] |
| Dimensional Modeling | DM is a logical design technique that seeks to present the data in a standard, intuitive framework that allows for high-performance access. It is inherently dimensional, and it adheres to a discipline that uses the relational model with some important restrictions. Every dimensional model is composed of one table with a multipart key, called the fact (sometimes referred to as measures) table, and a set of smaller tables called dimension tables. Each dimension table has a single-part primary key that corresponds exactly to one of the components of the multipart key in the fact table. Intelligent Enterprise[xiv] |
| Enterprise Java Beans (EJBs) | In a typical J2EE application, Enterprise JavaBeans (EJBs) contain the application's business logic and live business data. Although it is possible to use standard Java objects to contain your business logic and business data, using EJBs addresses many of the issues you would find by using simple Java objects, such as scalability, lifecycle management, and state management. Wikipedia[xv] |
| Fact | Dimensional modeling always uses the concepts of facts (sometimes referred to as measures) and dimensions. Facts are typically (but not always) numeric values that can be aggregated, and dimensions are groups of hierarchies and descriptors that define the facts. For example, sales amount is a fact; timestamp, product, register#, store#, etc. are elements of dimensions. Wikipedia[xvi] |

Glossary -continued

| Term | Definition |
|---|---|
| IIOP (Internet Inter-ORB Protocol) | IIOP (Internet Inter-ORB Protocol) is a protocol that makes it possible for distributed programs written in different programming languages to communicate over the Internet. SearchCIO-Midmarket[xvii] |
| KML | Keyhole Markup Language. Google ™ Earth is a geographic browser -- a powerful tool for viewing, creating and sharing interactive files containing highly visual location-specific information. These files are called KMLs (for Keyhole Markup Language): what HTML is to regular Internet browsers, KML is to geographic browsers. You can open KML files in both Google ™ Earth and Google ™ Maps, as well as in many other geographic browsers. Google ™ Maps[xviiiv] |
| MDT | The average time that a system is non-operational. This includes all time associated with repair, corrective and preventive maintenance; self imposed downtime, and any logistics or administrative delays. The difference between MDT and MTTR (mean time to repair) is that MDT includes any and all delays involved; MTTR looks solely at repair time. Wikipedia[xix] |
| Metadata | Metadata describes how data is queried, filtered, analyzed, and displayed in the described solution. In general terms, metadata is data about data. For example, in a library the metadata (pertaining to the catalog of books) could be - the title of the book, the author(s), categories (e.g. reference, fiction, non-fiction etc), physical location. This metadata can be used in searches, directories etc to help users locate books. |
| MTBF | Mean time between failures (MTBF) is the mean (average) time between failures of a system, and is often attributed to the 'useful life' of the device i.e. not including 'infant mortality' or 'end of life'. Calculations of MTBF assume that a system is 'renewed', i.e. fixed, after each failure, and then returned to service immediately after failure. The average time between failing and being returned to service is termed mean down time (MDT) or mean time to repair (MTTR). MTBF = (downtime − uptime)/number of failures. Wikipedia[xx] |
| MTTR | Mean Time to Recovery - the average time that a device will take to recover from a non-terminal failure. Examples of such devices range from self-resetting fuses (where the MTTR would be very short, probably seconds), up to whole systems which have to be replaced. The MTTR would usually be part of a maintenance contract, where the user would pay more for a system whose MTTR was 24 hours, than for one of, say, 7 days. This does not mean the supplier is guaranteeing to have the system up and running again within 24 hours (or 7 days) of being notified of the failure. It does mean the average repair time will tend towards 24 hours (or 7 days). A more useful maintenance contract measure is the maximum time to recovery which can be easily measured and the supplier held accountable. Wikipedia[xxi] |
| OLAP | On Line Analytical Processing. OLAP performs multidimensional analysis of business data and provides the capability for complex calculations, trend analysis, and sophisticated data modeling. OLAP enables end-users to perform ad hoc analysis of data in multiple dimensions, thereby providing the insight and understanding the need for better decision making. Paris ™ Technologies[xxii] |
| Planogram | A planogram is a diagram of fixtures and products that illustrates how and where retail products should be displayed, usually on a store shelf in order to increase customer purchases. They may also be referred to as planograms, plan-o-grams, schematics (archaic) or POGs. A planogram is often received before a product reaches a store, and is useful when a retailer wants multiple store displays to have the same look and feel. Often a consumer packaged goods manufacturer will release a new suggested planogram with their new product, to show how it relates to existing products in said category. Planograms are used nowadays in all kind of retail areas. A planogram defines which product is placed in which area of a shelving unit and with which quantity. The rules and theories for the creation of a planogram are set under the term of merchandising. Wikipedia[xxiii] |
| Request Queue | The Request Queue manages Visual Documents requests generated by a user or the scheduler. As requests are processed, the Visual Document maintains various statuses until the Visual Document is complete and available to be viewed by a user. |
| SaaS | Software as a Service. A software application delivery model where a software vendor develops a web-native software application and hosts and operates (either independently or through a third-party) the application for use by its customers over the Internet. Customers do not pay for owning the software itself but rather for using it. Wikipedia[xxiv] |
| Scrum | Scrum is an agile process that can be used to manage and control software development. With Scrum, projects progress via a series of iterations called sprints. These iterations could be as short as 1 week or as long as 1 month. Scrum is ideally suited for projects with rapidly changing or highly emergent requirements. The work to be done on a Scrum project is listed in the Product Backlog, which is a list of all desired changes to the product. At the start of each sprint a Sprint Planning Meeting is held during which the Product Owner prioritizes the Product Backlog and the Scrum Team selects the tasks they can complete during the coming Sprint. These tasks are then moved from the Product Backlog to the Sprint Backlog. Each day during the sprint a brief daily meeting is held called the Daily Scrum, which helps the team stay on track. At the end of each sprint the team demonstrates the completed functionality at a Sprint Review Meeting. |
| Self Organizing Maps (SOM) | A type of artificial neural network that is trained using unsupervised learning to produce a low-dimensional (typically two dimensional), representation of the input space of the training samples, called a map. The map seeks to preserve the topological properties of the input space. Wikipedia[xxv] |
| Servlets | Servlets are modules of Java code that run in a server application (hence the name "Servlets", similar to "Applets" on the client side) to answer client requests. Servlets are not tied to a specific client-server protocol but they are most commonly used with HTTP and the word "Servlet" is often used in the meaning of "HTTP Servlet". Servlets make use of the Java standard extension classes. Since servlets are written in the highly portable Java language and follow a standard framework, they provide a means to create sophisticated server extensions in a server and operating system independent way. Typical uses for HTTP Servlets include:<br>1. Processing and/or storing data submitted by an HTML form.<br>2. Providing dynamic content, e.g. returning the results of the database query to the client.<br>3. Managing state information on top of the stateless HTTP, e.g. for an online shopping cart system which manages shopping carts for many concurrent customers and maps every request to the right customer.<br>Servlet Essentials[xxvi] |
| Subject Matter Expert (SME) | The Subject Matter Expert is that individual who exhibits the highest level of expertise in performing a specialized job, task, or skill within the organization, Six Sigma[xxvii] |
| WebSphere | WebSphere is an IBM ™ brand of products that implement and extend Sun's JavaTwoEnterpriseEdition (J2EE) platform. The Java-based application and transaction infrastructure delivers high-volume transaction processing for e-business and provides |

| Glossary | |
|---|---|
| Term | Definition |
| | enhanced capabilities for transaction management, as well as security, performance, availability, connectivity, and scalability. IBM ™ WebSphere Product Pages[xxiii] |

Further Embodiments

It will be understood that the embodiments of the present invention described herein are by way of example only, and that various changes and modifications may be made without departing from the scope of invention.

It will be understood that any reference to displaying a visual representation on a screen equally applies to storing that representation or printing the representation onto any suitable medium. As explained above, the data used to display, store or print may be adjusted by the system according to the purpose of the data.

Further, it will be understood that any references in this document to any modules, engines or associated processing, analysis, determination, or other steps, may be implemented in any form. For example, the modules or engines may be implemented, and the associated steps may be carried out, using hardware, firmware or software.

DOCUMENT REFERENCES

[i] Wikipedia; "Heat map"; http://en.wikipedia.org/wiki/Heat_map
[ii] Nasdaq; Nasdaq-100 Dynamic Heatmap; http://screening.nasdaq.com/heatmaps/heatmap_100.asp
iii Few, Stephen—from white paper "BizViz: The Power of Visual Business Intelligence"—Mar. 7, 2006. www.perceptualedge.com
[iv] Weather.com; Date Accessed, Jan. 31, 2008; http://weather.com/.
['] Information Aesthetics; Information Aesthetics; "travel time maps"; Date Accessed, Jan. 31, 2008; http://infosthetics.com/archives/locative/
[vi] Wikipedia; Wikipedia; "Voronoi Diagram"; http://en.wikipedia.org/wiki/Voronoi_diagram.
[vii] ENTROPIA; ENTROPIA; "Más tiempo"; http://www.luispabon.com/entropia/index.php?entry=entry071129-145959.
[viii] Felix, B. Tan. Cases on Global IT Applications and Management: Successes and Pitfalls, Idea Group, 2001.
[ix] Weather.com; http://weather.com/.
[x] Information Aesthetics; Information Aesthetics; "travel time maps"; http://infosthetics.com/archives/locative/
[xi] Wikipedia; Wikipedia; "Thematic map"; http://en.wikipedia.org/wiki/Thematic_map
[xii] Wikipedia; Wikipedia; "Agile Software Development"; Date Accessed, Jan. 30, 2008; http://en.wikipedia.org/wiki/Agile_software_development
[xiii] Wikipedia; Wikipedia: "Dimensional Modeling"; Date Accessed: Apr. 10, 2008; http://en.wikipedia.org/wiki/Dimensional_modeling
[xiv] Kimball, Ralph, A Dimensional Modeling Manifesto; Date Accessed: Apr. 10, 2008; http://www.dbmsmag.com/9708d15.html
[xv] Sam's Publishing; developer.com Gamelan™; "Introduction to EJB's"; http://www.developer.com/java/ejb/article.php/1434371.
[xvi] Wikipedia; Wikipedia: "Dimensional Modeling"; Date Accessed: Apr. 10, 2008; http://en.wikipedia.org/wiki/Dimensional_modeling
[xvii] Gilbert, Cheryl, et. al.; SearchCIO—Midmarket; "HOP"; date Accessed, Jan. 30, 2008; http://searchcio-midmarket.techtarget.com/sDeftnition/0..sid183_gci214019,00.html
[xviii] Google; Google Maps; "KML Gallery: Explore the Earth on Google"; Date Accessed, Jan. 30, 2008; http://earth.google.com/gallery/
[xix] Wikipedia; Wikipedia; "Mean down time"; Date Accessed, Jan. 30, 2008; http://en.wikipedia.org/wiki/Mean_down_time.
[xx] Wikipedia; Wikipedia; "Mean time between failures"; Date Accessed, Jan. 30, 2008; http://en.wikipedia.org/wiki/Mean_time_between_failures.
[xxi] Wikipedia; Wikipedia; "Mean time to recovery"; Date Accessed, Jan. 30, 2008; http://en.wikipedia.org/wiki/Mean_time_to_recovery.
[xxii] Paris Technologies, Inc.; Paris Technologies; "OLAP"; Date Accessed, Jan. 30, 2008; http://www.olap.com.
[xxiii] Wikipedia; Wikipedia; "Planogram"; Date Accessed, Jan. 30, 2008; http://en.wikipedia.org/wiki/Planogram.
[xxiv] Wikipedia; Wikipedia; "Software as a Service"; Date Accessed, Jan. 30, 2008; http://en.wikipedia.org/wiki/Software_as_a_Service.
[xxv] Wikipedia; Wikipedia; "Self-organizing map"; Date Accessed, Jan. 30, 2008; http://en.wikipedia.org/wiki/Self-organizing_map.
[xxvi] Zeiger, Stefan, Servlet Essentials, Version 1.3.6—Nov. 4, 1999; Date Accessed, Jan. 30, 2008
[xxvii] Six Sigma; Subject Matter Expert—SME; Date Accessed: Jan. 30, 2008; http://www.isixsigma.com/dictionary/Subject_Matter_Expert_-_SME-396.htm
[xxviii] IBM; WebSphere Product Pages; "WebSphere software"; Date Accessed: Jan. 30, 2008; http://www-306.ibm.com/software/websphere/?pgel=ibmhzn&cm_re=masthead-_-products-_-sw-websphere.

What we claim is:

1. In a data visualization computing system implemented on an electronic computing device, a method of analyzing and graphically representing a correlation of a plurality of transaction items occurring within a physical locality, the method comprising the steps of:

graphically representing on the electronic computing device the physical locality, the graphical representation on the electronic computing device including a graphical representation of a plurality of locations within the physical locality;

retrieving data associated with the transaction items, the data including information on the location of the items within the physical locality;

correlating the transaction items in a dimensionally reduced manner using the retrieved data;

graphically representing the correlated transaction items as a graphical overlay over the graphical representation of the physical locality, the graphical representation of the correlated transaction items and the correlated transaction items being linked;

creating a tree hierarchy using the retrieved data, wherein the tree hierarchy classifies the transaction items in a hierarchy according to a defined user understandable factor;

graphically representing the tree hierarchy as a graphical textual tree hierarchy, wherein the graphical representation of the physical locality, the graphical overlay and the graphical textual tree hierarchy all displayed in a combined graphical representation, and wherein the graphical overlay and the graphical textual tree hierarchy are linked to the correlated transaction items; and graphically representing in the combined graphical representation an interaction between the correlated transaction items and at least one transaction item in the tree hierarchy by i) detecting by the electronic computing device a selection in one of the graphical overlay, graphical textual tree hierarchy and the graphical representation of the physical locality and ii) graphically representing how the graphical overlay, graphical textual tree hierarchy and the graphical representation of the physical locality are linked.

2. The method of claim 1, wherein a selection of a transaction item in the graphical representation of the physical locality results in a visual identification of a corresponding transaction item in the graphical textual tree hierarchy and in the graphical overlay.

3. The method of claim 1, further comprising the step of highlighting the link between the selected graphical overlay, graphical textual tree hierarchy or graphical representation of the correlated transaction items and the linked graphical overlay, graphical textual tree hierarchy and the graphical representation of the physical locality in the graphical representation.

4. The method of claim 1, wherein further data associated with the correlated transaction items is displayed when one or more portions of the tree hierarchy are selected.

5. The method of claim 1, wherein the tree hierarchy is graphically represented using a textual tree representation.

6. The method of claim 1, wherein the tree hierarchy is graphically represented using an R-Tree representation.

7. The method of claim 1, wherein the graphical representation of the correlated transaction items is in the form of a heat map.

8. The method of claim 7, wherein the graphical representation enables interaction with the heat map to explore the detail of information upon which the heat map is based and/or supplementary information.

9. The method of claim 1, wherein the correlation between transaction items in relation to one or more transaction attributes is determined.

10. The method of claim 9, wherein the one or more transaction attributes is time related.

11. The method of claim 10, wherein the time related attribute is time of sale of a transaction item.

12. The method of claim 1, wherein transaction items are correlated according to product type, product branding or market segment.

13. The method of claim 1, wherein only correlations above a defined threshold level are graphically represented.

14. The method of claim 13, wherein the threshold is one of a frequency threshold, magnitude threshold and business performance threshold.

15. The method of claim 1, wherein the physical locality is a store.

16. The method of claim 1, wherein the physical locality is a department store.

17. The method of claim 16, wherein the location is a position on a shelf within the department store.

18. The method of claim 1, wherein the physical locality is a casino.

19. In a data visualization computing system implemented on an electronic computing device, a method of analyzing and graphically representing a correlation of a plurality of transaction items, the method comprising the steps of:

retrieving data associated with the transaction items;

correlating the transaction items in a dimensionally reduced manner using the retrieved data;

graphically representing on the electronic computing device the correlated transaction items, the graphical representation of the correlated transaction items and the correlated transaction items being linked;

creating a tree hierarchy using the retrieved data, wherein the tree hierarchy classifies the transaction items in a hierarchy according to a defined user understandable factor;

graphically representing on the electronic computing device the tree hierarchy i) as a graphical overlay over a top of the graphical representation of the correlated transaction items, and ii) as a graphical textual tree hierarchy, the graphical representation of correlated transaction items, the graphical overlay and the graphical textual tree hierarchy all being displayed in a combined graphical representation, wherein the graphical overlay and the graphical textual tree hierarchy are linked to the correlated transaction items; and graphically representing on the electronic computing device in the combined graphical representation an interaction between the correlated transaction items and at least one transaction item in the tree hierarchy by i) detecting by the electronic computing device a selection in one of the graphical overlay, graphical textual tree hierarchy and the graphical representation of the correlated transaction items and ii) graphically representing how the graphical overlay, graphical textual tree hierarchy and the graphical representation of the correlated transaction items are linked.

\* \* \* \* \*